(12) United States Patent
Oishi

(10) Patent No.: US 10,030,092 B2
(45) Date of Patent: Jul. 24, 2018

(54) MULTICOMPONENT COPOLYMER, RUBBER COMPOSITION, AND TIRE

(71) Applicant: BRIDGESTONE CORPORATION, Tokyo (JP)

(72) Inventor: Shigeki Oishi, Hachioji (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/317,548

(22) PCT Filed: Jun. 3, 2015

(86) PCT No.: PCT/JP2015/002816
§ 371 (c)(1),
(2) Date: Dec. 9, 2016

(87) PCT Pub. No.: WO2015/190072
PCT Pub. Date: Dec. 17, 2015

(65) Prior Publication Data
US 2017/0137552 A1  May 18, 2017

(30) Foreign Application Priority Data
Jun. 12, 2014  (JP) ................. 2014-121722

(51) Int. Cl.
*C08F 236/10* (2006.01)
*B60C 1/00* (2006.01)
*C08F 4/52* (2006.01)

(52) U.S. Cl.
CPC .......... *C08F 236/10* (2013.01); *B60C 1/0016* (2013.01)

(58) Field of Classification Search
USPC ...................................... 526/339
See application file for complete search history.

(56) References Cited

U.S. PATENT DOCUMENTS

| | | | |
|---|---|---|---|
| 2,438,340 A | 3/1948 | Johnson | |
| 2,479,450 A | 8/1949 | Young et al. | |
| 3,910,865 A | 10/1975 | Osborn et al. | |
| 4,779,657 A | 10/1988 | Cheung et al. | |
| 6,706,830 B2 * | 3/2004 | Windisch | C08F 236/04 526/129 |
| 7,294,664 B2 | 11/2007 | Jones et al. | |
| 8,507,627 B2 * | 8/2013 | Nakagawa | B60C 1/00 526/133 |
| 2014/0018493 A1 * | 1/2014 | Horikawa | B60C 1/00 524/574 |

FOREIGN PATENT DOCUMENTS

| | | |
|---|---|---|
| EP | 1 764 375 A1 | 3/2007 |
| EP | 2 017 280 A1 | 1/2009 |
| EP | 2 599 802 A1 | 6/2013 |
| EP | 2 824 120 A1 | 1/2015 |
| GB | 1349381 A | 4/1974 |
| JP | 9-291121 A | 11/1997 |
| JP | 11-35744 A | 2/1999 |
| JP | 11-35810 A | 2/1999 |
| JP | 11-80269 A | 3/1999 |
| WO | 2004/044018 A2 | 5/2004 |
| WO | 2006/004068 A1 | 1/2006 |
| WO | 2007/129670 A1 | 11/2007 |
| WO | 2012/014455 A1 | 2/2012 |

OTHER PUBLICATIONS

International Search Report for PCT/JP2015/002816, dated Aug. 11, 2015.

* cited by examiner

*Primary Examiner* — Fred M Teskin
(74) *Attorney, Agent, or Firm* — Sughrue Mion, PLLC

(57) ABSTRACT

Provided is a polymer that contributes to the improvement of the durability and weather resistance of rubber compositions or rubber products such as a tire, and has low crystallinity. Disclosed is a multicomponent copolymer comprising a conjugated diene unit, a non-conjugated olefin unit, and an aromatic vinyl unit, wherein the multicomponent copolymer has a main chain consisting only of an acyclic structure, and the content of cis-1,4 bonds in the entire conjugated diene unit is 50% or more.

19 Claims, 2 Drawing Sheets

MULTICOMPONENT COPOLYMER, RUBBER COMPOSITION, AND TIRE

This is a National Stage of International Application No. PCT/JP2015/002816 filed Jun. 3, 2015, claiming priority based on Japanese Patent Application No. 2014-121722 filed Jun. 12, 2014, the contents of all of which are incorporated herein by reference in their entirety.

TECHNICAL FIELD

This disclosure relates to a multicomponent copolymer, a rubber composition, and a tire.

BACKGROUND ART

Rubber products (such as tires, conveyor belts, vibration-insulating rubbers, and seismic isolation rubbers) are generally required to have high durability (such as fracture resistance, wear resistance, and crack growth resistance) and weather resistance. In order to meet such demand, various rubber components and rubber compositions have been developed.

For example, WO2012/014455A (PTL 1) discloses a copolymer of a conjugated diene compound and a non-conjugated olefin in which the cis-1,4 bond content of the conjugated diene portion (units derived from a conjugated diene compound) is greater than 70.5 mol % and the non-conjugated olefin content is 10 mol % or more, and also discloses the use of the component for manufacturing rubber having good crack growth resistance and good weather resistance.

CITATION LIST

Patent Literature

PTL 1: International Publication No. WO 2012/014455

SUMMARY

Technical Problem

However, since such copolymer is a binary copolymer formed by polymerizing one type of conjugated diene compound and one type of non-conjugated olefin compound, the chain length of a portion consisting of consecutive units derived from a single non-conjugated olefin compound that contributes to the improvement of the weather resistance, and in particular, the chain length of a portion consisting of consecutive units derived from ethylene in the case of using such ethylene becomes long, and thus, crystallinity tends to be increased. Such increase in crystallinity in copolymers involves a fear of damaging the physical properties as an elastomer, and also a fear of impairing workability in using such copolymers to produce rubber compositions and rubber products (in particular, in the process of kneading in producing rubber composition).

Hence, taking into consideration the aforementioned problems of the prior art techniques, it is an object of the disclosure to provide a polymer that contributes to the improvement of the durability and weather resistance of rubber compositions or rubber products such as a tire, and has low crystallinity. In addition, it is another object of the disclosure to provide a rubber composition and a tire, which can be produced with high workability and have high durability and weather resistance.

Solution to Problem

The polymer of the disclosure achieves the aforementioned objects, and specifically, the present polymer is a multicomponent copolymer comprising a conjugated diene unit, a non-conjugated olefin unit and an aromatic vinyl unit, wherein the multicomponent copolymer has a main chain consisting only of an acyclic structure, and the content of cis-1,4 bonds in the entire conjugated diene unit is 50% or more.

Herein, in the present description, the "conjugated diene unit" indicates a unit equivalent to a unit derived from a conjugated diene compound in the copolymer, the "non-conjugated olefin unit" indicates a unit equivalent to a unit derived from a non-conjugated olefin compound in the copolymer, and the "aromatic vinyl unit" indicates a unit equivalent to a unit derived from an aromatic vinyl compound in the copolymer.

Moreover, in the present description, the "conjugated diene compound" indicates a conjugated-system diene compound, the "non-conjugated olefin compound" indicates a non-conjugated-system aliphatic unsaturated hydrocarbon compound having one or more carbon-carbon double bonds, and the "aromatic vinyl compound" indicates an aromatic compound substituted with at least a vinyl group, which is not included in the conjugated diene compound.

Furthermore, in the present description, the "main chain" indicates a long chain portion formed by connecting the binding termini of individual units with one another in the copolymer, and the main chain may be a straight chain or a branched chain, depending on the chain structure of the copolymer. That is to say, the "main chain" does not include a branched portion that does not bind to a unit adjacent thereto in each unit constituting the copolymer.

Further, in the present description, the "multicomponent copolymer" indicates a copolymer formed by polymerizing three or more types of monomers.

The rubber composition of the disclosure is characterized in that it comprises the multicomponent copolymer of the disclosure.

The tire of the disclosure is characterized in that it uses the rubber composition of the disclosure.

Advantageous Effect

According to the disclosure, a polymer that contributes to the improvement of the durability and weather resistance of rubber compositions or rubber products such as a tire, and has low crystallinity, can be provided. In addition, according to the disclosure, a rubber composition and a tire, which can be produced with high workability and have high durability and weather resistance, can be provided.

BRIEF DESCRIPTION OF THE DRAWINGS

In the accompanying drawings.

DETAILED DESCRIPTION

Figure 1:
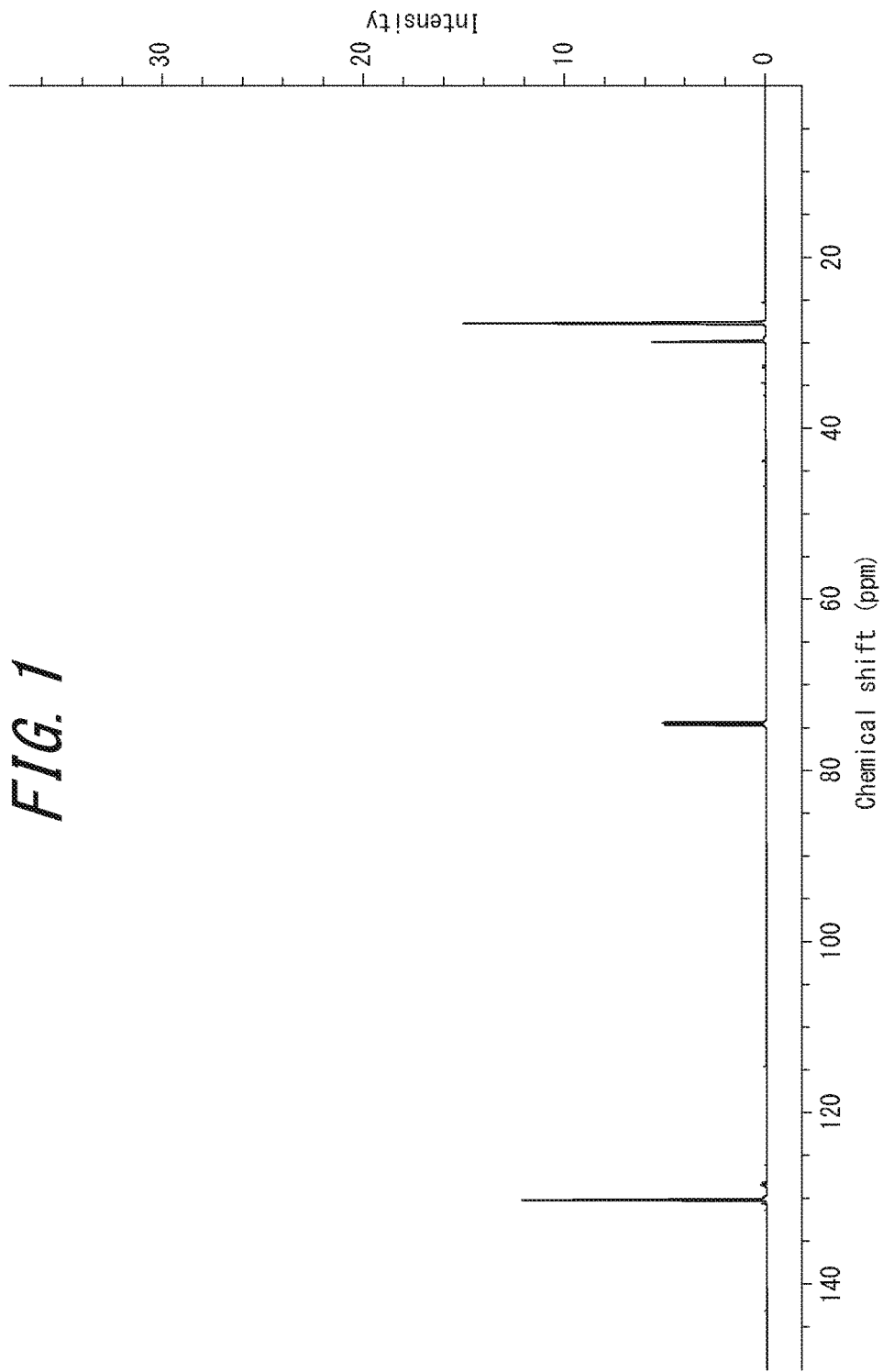
FIG. 1 is a view showing the $^{13}$C-NMR spectrum chart (in the range of 0 to 150 ppm) of copolymer A in Examples.

Hereinafter, the disclosure will be illustrated and described in detail based on the embodiments thereof.

(Multicomponent Copolymer)

The multicomponent copolymer of the disclosure is a multicomponent copolymer comprising a conjugated diene unit, a non-conjugated olefin unit, and an aromatic vinyl unit, which is greatly characterized in that the multicomponent copolymer has a main chain consisting only of an acyclic structure. The present inventors have compared the above described multicomponent copolymer formed by polymerizing a conjugated diene compound, a non-conjugated olefin compound and an aromatic vinyl compound, with a binary copolymer formed by polymerizing a conjugated diene compound and a non-conjugated olefin compound. As a result, the inventors have found that a large difference is not found in the chain length of a portion constituted with a unit derived from the conjugated diene compound between the two types of copolymers, but that the chain length of a portion constituted with a unit derived from the non-conjugated olefin compound becomes shorter in the aforementioned multicomponent copolymer than in the aforementioned binary copolymer. Likewise, the present inventors have compared the above described multicomponent copolymer with a multicomponent copolymer formed by polymerizing a conjugated diene compound and an aromatic vinyl compound. As a result, the inventors have found that a large difference is not found in the chain length of a portion constituted with a unit derived from the conjugated diene compound between the two above types of copolymers, but that the chain length of a portion constituted with a unit derived from the aromatic vinyl compound becomes shorter in the aforementioned multicomponent copolymer than in the aforementioned binary copolymer. Thus, based on these findings, the present inventors have found that the crystallinity of the multicomponent copolymer can be significantly decreased, in comparison to the aforementioned binary copolymer, thereby completing the disclosure. As such, the multicomponent copolymer of the disclosure achieves both high durability and high weather resistance because it comprises a conjugated diene unit, a non-conjugated olefin unit and an aromatic vinyl unit, and further, the present multicomponent copolymer has low crystallinity because it comprises a non-conjugated olefin unit and an aromatic vinyl unit. Accordingly, the multicomponent copolymer of the disclosure can be preferably used to produce rubber compositions, rubber products and the like, and can also be used to improve workability upon the production of rubber compositions, rubber products and the like.

Moreover, since the multicomponent copolymer of the disclosure can be produced by using, as monomers, a conjugated diene compound, a non-conjugated olefin compound and an aromatic vinyl compound, it can have both high durability, which is derived from the conjugated diene compound, and high weather resistance, which is caused by a reduction in the ratio of double bonds due to the mediation of the non-conjugated olefin compound and the aromatic vinyl compound.

Furthermore, as described in the production method below, the multicomponent copolymer of the disclosure can be produced by synthesis in a single reaction vessel, namely, by one-pot synthesis, and thus, the present multicomponent copolymer can be produced by a simple process.

Still further, since the multicomponent copolymer of the disclosure can be polymerized by using a conjugated diene compound as a monomer, it is excellent in terms of crosslinking properties, in comparison to a copolymer formed by performing polymerization using a non-conjugated diene compound, such as, for example, a known ethylene-propylene-non-conjugated diene copolymer (EPDM). Accordingly, the multicomponent copolymer of the disclosure is also advantageous in that it can improve the mechanical properties of a rubber composition or a rubber product, which is produced by using the same.

Further, since the multicomponent copolymer of the disclosure has a main chain consisting only of an acyclic structure and the 1,4-bond derived from butadiene has a high cis structure, it is advantageous in that it improves crack resistance. It is noted that NMR is used as a principal measurement means for confirming whether or not the main chain of the copolymer has a cyclic structure. Specifically, when a peak derived from a cyclic structure existing in a main chain (for example, a peak appearing at 10 to 24 ppm in the case of three- to five-membered rings) is not observed, it indicates that the main chain of the copolymer consists only of an acyclic structure.

The conjugated diene unit comprised in the multicomponent copolymer of the disclosure is generally a unit derived from a conjugated diene compound as a monomer, and this conjugated diene compound preferably contains 4 to 8 carbon atoms. Specific examples of such a conjugated diene compound include 1,3-butadiene, isoprene, 1,3-pentadiene, and 2,3-dimethyl-1,3-butadiene. The above described conjugated diene compound may be either a single type of conjugated diene compound or a combination of two or more types of conjugated diene compounds. In addition, the conjugated diene compound comprised as a monomer in the multicomponent copolymer of the disclosure preferably comprises 1,3-butadiene and/or isoprene, more preferably consists only of 1,3-butadiene and/or isoprene, and further preferably consists only of 1,3-butadiene, from the viewpoint of effectively improving the durability of a rubber composition, a tire or the like, in which the obtained multicomponent copolymer is used. In other words, the conjugated diene unit in the multicomponent copolymer of the disclosure preferably comprises a 1,3-butadiene unit and/or an isoprene unit, more preferably consists only of a 1,3-butadiene unit and/or an isoprene unit, and further preferably consists only of a 1,3-butadiene unit.

Moreover, the multicomponent copolymer of the disclosure is greatly characterized in that the content of cis-1,4 bonds in the entire conjugated diene unit is 50% or more. If the content of cis-1,4 bonds in the entire conjugated diene unit is 50% or more, a glass transition temperature is lowered, so that the durability of a rubber composition, a tire or the like comprising the obtained multicomponent copolymer, such as crack growth resistance or abrasion resistance, can be effectively improved. From the same viewpoint as that described above, with regard to the multicomponent copolymer of the disclosure, the content of cis-1,4 bonds in the entire conjugated diene unit is preferably 70% or more, more preferably 80% or more, and further preferably 90% or more. It is to be noted that such a multicomponent copolymer having a high content of cis-1,4 bonds in the entire conjugated diene unit can be obtained by using, as monomers, a conjugated diene compound, a non-conjugated olefin compound, and an aromatic vinyl compound.

On the other hand, the content of vinyl bonds (a 1,2-vinyl bond, a 3,4-vinyl bond, etc.) in the entire conjugated diene unit is preferably 30% or less, more preferably 15% or less, further preferably 10% or less, and particularly preferably 6% or less. In addition, the content of trans-1,4 bonds in the entire conjugated diene unit is preferably 30% or less, more preferably 15% or less, and further preferably 10% or less.

The non-conjugated olefin unit comprised in the multicomponent copolymer of the disclosure is generally a unit derived from a non-conjugated olefin compound as a monomer, and this non-conjugated olefin compound preferably contains 2 to 10 carbon atoms. Specific examples of such a non-conjugated olefin compound include α-olefins such as ethylene, propylene, 1-butene, 1-pentene, 1-hexene, 1-heptene or 1-octene, and heteroatom-substituted alkene compounds such as vinyl pivalate, 1-phenylthioethene or N-vinyl pyrrolidone. The above described non-conjugated olefin compound may be either a single type of non-conjugated olefin compound or a combination of two or more types of non-conjugated olefin compounds. In addition, the non-conjugated olefin compound comprised as a monomer in the multicomponent copolymer of the disclosure is preferably an acyclic non-conjugated olefin compound from the viewpoints of further reducing the crystallinity of the obtained multicomponent copolymer and further improving the weather resistance of a rubber composition, a tire or the like, in which the obtained multicomponent copolymer is used. In addition, the acyclic non-conjugated olefin compound is more preferably α-olefin, and is further preferably α-olefin containing ethylene, and the acyclic non-conjugated olefin compound particularly preferably consists only of ethylene. In other words, the non-conjugated olefin unit in the multicomponent copolymer of the disclosure is preferably an acyclic non-conjugated olefin unit, and the acyclic non-conjugated olefin unit is more preferably an α-olefin unit, and is further preferably an α-olefin unit containing an ethylene unit, and still further preferably consists only of an ethylene unit.

The aromatic vinyl unit comprised in the multicomponent copolymer of the disclosure is generally a unit derived from an aromatic vinyl compound as a monomer, and this aromatic vinyl compound preferably contains 8 to 10 carbon atoms. Examples of such an aromatic vinyl compound include styrene, o-methylstyrene, m-methylstyrene, p-methylstyrene, o,p-dimethylstyrene, o-ethylstyrene, m-ethylstyrene, and p-ethylstyrene. The above described aromatic vinyl compound may be either a single type of aromatic vinyl compound or a combination of two or more types of aromatic vinyl compounds. In addition, the aromatic vinyl compound comprised as a monomer in the multicomponent copolymer of the disclosure preferably comprises styrene, and more preferably consists only of styrene, from the viewpoints of further reducing the crystallinity of the obtained multicomponent copolymer and further improving the weather resistance of a rubber composition, a tire and the like, in which the obtained multicomponent copolymer is used. In other words, the aromatic vinyl unit in the multicomponent copolymer of the disclosure preferably comprises a styrene unit, and more preferably consists only of a styrene unit.

It is to be noted that the aromatic ring in the aromatic vinyl unit is not included in the main chain of the copolymer, as long as it does not bind to a unit adjacent thereto.

The number of types of monomers comprised in the multicomponent copolymer of the disclosure is not particularly limited, as long as the multicomponent copolymer comprises a conjugated diene unit, a non-conjugated olefin unit, and an aromatic vinyl unit. However, from the viewpoint of improving durability, weather resistance and crystallinity, the multicomponent copolymer of the disclosure is preferably a polymer formed by performing polymerization, at least, using one type of conjugated diene compound, one type of non-conjugated olefin compound, and one type of aromatic vinyl compound, as a monomer. In other words, the multicomponent copolymer of the disclosure is preferably a multicomponent copolymer comprising one type of conjugated diene unit, one type of non-conjugated olefin unit, and one type of aromatic vinyl unit. Moreover, the multicomponent copolymer of the disclosure is more preferably a terpolymer consisting only of one type of conjugated diene unit, one type of non-conjugated olefin unit, and one type of aromatic vinyl unit, and is further preferably a terpolymer consisting only of a 1,3-butadiene unit, an ethylene unit, and a styrene unit. Herein, the "one type of conjugated diene unit" includes conjugated diene units having different binding modes.

The melting point ($T_m$) of the multicomponent copolymer of the disclosure is preferably lowered, in comparison to the melting point ($T_m$) of a binary copolymer that is formed by polymerizing the conjugated diene compound used in the multicomponent copolymer with any one of the non-conjugated olefin compound and the aromatic vinyl compound used in the multicomponent copolymer. More specifically, the multicomponent copolymer of the disclosure has a melting point ($T_m$) of preferably 100° C. or lower, more preferably 80° C. or lower, and particularly preferably 50° C. or lower. Also, such a melting point ($T_m$) preferably has disappeared in the multicomponent copolymer of the disclosure. In such a case, in comparison to the conventional binary copolymer, the advantage of the disclosure characterized in that polymerization is performed using a non-conjugated olefin compound and an aromatic vinyl compound can be more enjoyed, although crystallinity has been reduced only by newly adding such a non-conjugated olefin compound or an aromatic vinyl compound as a monomer. That is to say, in such a case, a rubber composition, a tire and the like, in which such a multicomponent copolymer is used, can be produced with high workability, and further, the durability and weather resistance of the rubber composition, the tire and the like can be increased.

In a case where the above-mentioned copolymer has a plurality of melting points, the above described comparison is carried out using the highest melting point among them.

The content of the conjugated diene unit in the multicomponent copolymer of the disclosure is preferably 1 to 99 mol %, more preferably 5 to 95 mol %, and particularly preferably 10 to 90 mol %. If the content of the conjugated diene unit is 1 mol % or more, it becomes possible for the multicomponent copolymer to uniformly behave as an elastomer, and thus, higher durability can be obtained. On the other hand, if the content of the conjugated diene unit is 99 mol % or less, sufficient effects can be obtained by using such a non-conjugated olefin compound and an aromatic vinyl compound.

Moreover, the total content of the non-conjugated olefin unit and the aromatic vinyl unit in the multicomponent copolymer of the disclosure is preferably 1 to 99 mol %, more preferably 5 to 95 mol %, and particularly preferably 10 to 90 mol %. If the total content of the non-conjugated olefin unit and the aromatic vinyl unit is 1 mol % or more, the weather resistance of the multicomponent copolymer becomes sufficiently high. On the other hand, if the total content is 99 mol % or less, sufficient effects can be obtained by using such a conjugated diene compound. Furthermore, in the case of the conventional binary copolymer (e.g., a polymer of a conjugated diene compound and a non-conjugated olefin compound, and a polymer of a conjugated diene compound and an aromatic vinyl compound), in general, if the content of a unit derived from the non-conjugated olefin compound or a unit derived from the aromatic vinyl compound is 50 mol % or more, namely, if the content of a unit derived from the conjugated diene compound is 50 mol % or less, the sufficient physical properties of the copolymer as an elastomer are lost. However, in the disclosure, since crystallinity is kept low by using the non-conjugated olefin compound and the aromatic vinyl compound, the physical properties of the copolymer as an elastomer can be ensured, even if the total content of the non-conjugated olefin unit and the aromatic vinyl unit is, for example, 90 mol %.

Further, in the multicomponent copolymer of the disclosure, the ratio of either one unit of the non-conjugated olefin unit or the aromatic vinyl unit is preferably 1 to 99 mol %, more preferably 3 to 97 mol %, and particularly preferably 10 to 90 mol %. Thus, crystallinity can be effectively reduced by allowing the present multicomponent copolymer to comprise each of the aforementioned two types of units at a content of at least 1 mol %.

The multicomponent copolymer of the disclosure may comprise any given units, other than the aforementioned conjugated diene unit, non-conjugated olefin unit, and aromatic vinyl unit. However, from the viewpoint of obtaining the desired effects of the disclosure, the content of any given units, other than the conjugated diene unit, the non-conjugated olefin unit and the aromatic vinyl unit in the multicomponent copolymer of the disclosure is more preferably 0 mol %.

The multicomponent copolymer of the disclosure has a weight average molecular weight (Mw) relative to polystyrene standards of, preferably 10,000 to 10,000,000, more preferably 100,000 to 9,000,000, and particularly preferably 150,000 to 8,000,000. By setting the above described Mw of the multicomponent copolymer at 10,000 or more, sufficient mechanical strength of the multicomponent copolymer as a raw material for rubber products can be ensured. On the other hand, by setting the Mw at 10,000,000 or less, high workability can be retained.

Moreover, the multicomponent copolymer of the disclosure has a molecular weight distribution (Mw/Mn) (which indicates to be the ratio between the weight average molecular weight (Mw) and the number average molecular weight (Mn)) of preferably 10.0 or less, more preferably 9.0 or less, and particularly preferably 8.0 or less. By setting the above described molecular weight distribution of the multicomponent copolymer at 10.0 or less, sufficient homogeneity can be provided to the physical properties of the above described multicomponent copolymer.

It is to be noted that the above-mentioned weight average molecular weight and molecular weight distribution are obtained according to gel permeation chromatography (GPC), using polystyrene as a standard substance.

The chain structure of the multicomponent copolymer of the disclosure is not particularly limited, and it can be selected, as appropriate, depending on purpose. For example, when the conjugated diene unit is represented by A, the non-conjugated olefin unit is represented by B, and the aromatic vinyl unit is represented by C, the multicomponent copolymer of the disclosure can be a block copolymer having a configuration such as $A_x$-$B_y$-$C_z$ (wherein x, y and z each represent an integer of 1 or greater), a random copolymer having a configuration in which A, B and C are randomly aligned, a tapered copolymer formed by mixing the random copolymer with the block copolymer, or an alternating copolymer having a configuration such as (A-B-C)$_w$ (wherein w represents an integer of 1 or greater).

Moreover, the multicomponent copolymer of the disclosure may have a structure in which the conjugated diene unit, the non-conjugated olefin unit, and the aromatic vinyl unit are linearly chained (linear structure), or may also have a structure in which at least any one of the conjugated diene unit, the non-conjugated olefin unit, and the aromatic vinyl unit forms a branched chain and they are chained to one another (branched structure). When the multicomponent copolymer of the disclosure has a branched structure, the branched chain can also be a two-component chain or a multicomponent chain (namely, the branched chain can comprise at least two of the conjugated diene unit, the non-conjugated olefin unit, and the aromatic vinyl unit). Therefore, among the multicomponent copolymers of the disclosure, a multicomponent copolymer having a branched structure comprising a two-component or multicomponent branched chain can be clearly distinguished from a conventional graft copolymer that is formed from a single type of unit, in which a chain as a stem is different from a side chain.

(Method for Producing Multicomponent Copolymer)

Next, an example of a method for producing the multicomponent copolymer of the disclosure will be described in detail. An example of a method for producing the multicomponent copolymer of the disclosure is premised on the use of a conjugated diene compound, a non-conjugated olefin compound and an aromatic vinyl compound as monomers, and this production method comprises at least a polymerization step, and may further comprise, appropriately, a coupling step, a cleaning step and other steps, as necessary. Herein, in the production of the multicomponent copolymer of the disclosure, preferably, only a non-conjugated olefin compound and an aromatic vinyl compound are added in the presence of a catalyst, without addition of a conjugated diene compound, to polymerize these. In particular, in a case where the after-mentioned polymerization catalyst composition is used, since the conjugated diene compound has higher reactivity than the non-conjugated olefin compound and the aromatic vinyl compound, it is likely that it becomes difficult to polymerize the non-conjugated olefin compound and/or the aromatic vinyl compound in the presence of the conjugated diene compound. In addition, considering the properties of the catalyst, it also becomes difficult to previously polymerize the conjugated diene compound, and then, to additionally polymerize the non-conjugated olefin compound and the aromatic vinyl compound.

As polymerization methods, any given methods, such as a solution polymerization method, a suspension polymerization method, a liquid phase bulk polymerization method, an emulsion polymerization method, a gas phase polymerization method, or a solid phase polymerization method, can be used. In addition, when a solvent is used in the polymerization reaction, the type of such a solvent is not particularly limited, as long as it is inactive in the polymerization reaction. Examples of such a solvent include toluene, cyclohexane, and normal hexane.

In the polymerization step, the polymerization reaction is preferably carried out in an inert gas atmosphere, and preferably in a nitrogen gas or argon gas atmosphere. The polymerization temperature applied in the above described polymerization reaction is not particularly limited, and for example, it is preferably in the range of −100° C. to 200° C., and can also be set at approximately a room temperature. If the polymerization temperature is increased, the cis-1,4 selectivity of the polymerization reaction may be decreased. Moreover, in order to incorporate a sufficient amount of conjugated diene compound in the polymerization reaction system, the pressure applied in the above described polymerization reaction is preferably in the range of 0.1 to 10.0 MPa. Furthermore, the reaction time required for the above described polymerization reaction is not particularly limited, either, and for example, it is preferably in the range of 1 second to 10 days. The reaction time can be selected, as appropriate, depending on conditions such as the type of the catalyst or the polymerization temperature.

Further, in the above described polymerization step of the conjugated diene compound, polymerization may be terminated by using a polymerization terminator such as methanol, ethanol or isopropanol.

Herein, the above described polymerization step of polymerizing the non-conjugated olefin compound, the aromatic vinyl compound and the conjugated diene compound preferably comprises a step of polymerizing various types of monomers in the presence of the below-mentioned first polymerization catalyst composition, second polymerization catalyst composition, or third polymerization catalyst composition.

—First Polymerization Catalyst Composition—

The first polymerization catalyst composition (hereinafter also referred to as a "1st polymerization catalyst composition") will be described.

An example of the 1st polymerization catalyst composition is a polymerization catalyst composition comprising:

component (A): a rare-earth element compound, or a reaction product of the rare-earth element compound with a Lewis base, wherein the rare-earth element compound or the reaction product does not have the bond of the rare-earth element with carbon, and component (B): at least one selected from the group consisting of an ionic compound (B-1) consisting of a non-coordinating anion and a cation, aluminoxane (B-2), and at least one type of halogen compound (B-3) from Lewis acid, a complex compound of a metal halide and a Lewis base, and an organic compound comprising active halogen.

When the 1st polymerization catalyst composition comprises at least one of the ionic compound (B-1) and the halogen compound (B-3), the polymerization catalyst composition further comprises, as component (C), an organic metal compound represented by the following general formula (I):

wherein Y represents a metal selected from the groups 1, 2, 12, and 13 of the periodic table. $R^1$ and $R^2$ each represent a hydrocarbon group containing 1 to 10 carbon atoms, or a hydrogen atom, and $R^3$ represents a hydrocarbon group containing 1 to 10 carbon atoms, wherein $R^1$, $R^2$ and $R^3$ may be the same as or different from one another, and when Y is a metal selected from the group 1 of the periodic table, a is 1 and b and c are 0, when Y is a metal selected from the groups 2 and 12 of the periodic table, a and b are 1 and c is 0, and when Y is a metal selected from the group 13 of the periodic table, a, b and c are 1.

Since the ionic compound (B-1) and the halogen compound (B-3) do not contain carbon atoms to be supplied to the component (A), these compounds need the above described component (C) as a source for supplying carbon to the component (A). Even in a case where the above described polymerization catalyst composition comprises the aluminoxane (B-2), it can also comprise the component (C). In addition, the 1st polymerization catalyst composition may also comprise other components that are contained in ordinary rare-earth element compound-based polymerization catalyst compositions, such as a promoter.

The concentration of the component (A) comprised in the 1st polymerization catalyst composition in the polymerization reaction system is preferably in the range of 0.1 to 0.0001 mol/l.

Further, the polymerization catalyst composition preferably contains an additive D that can be an anionic ligand.

The component (A) used in the above described 1st polymerization catalyst composition is a rare-earth element compound, or a reaction product of the rare-earth element compound with a Lewis base. Herein, the rare-earth element compound and the reaction product of the rare-earth element compound with the Lewis base do not have the bond of a rare-earth element with carbon. When the rare-earth element compound and the reaction product do not have a rare-earth element-carbon bond, the compound is stable, and thus, is easily treated. Herein, the rare-earth element compound means a compound containing a rare-earth element (M), namely, a lanthanoid element constituted with elements having atomic numbers 57 to 71 in the periodic table, or scandium or yttrium.

Specific examples of such lanthanoid elements include lanthanum, cerium, praseodymium, neodymium, promethium, samarium, europium, gadolinium, terbium, dysprosium, holmium, erbium, thulium, ytterbium, and lutetium. The component (A) may be used singly or in combinations of two or more.

Moreover, in the above described rare-earth element compound, the rare-earth metal is preferably a divalent or trivalent salt, or a complex compound, and is more preferably a rare-earth element compound containing one or two or more ligands selected from a hydrogen atom, a halogen atom, and an organic compound residue. Furthermore, the above described rare-earth element compound, or the above described reaction product of the rare-earth element compound with the Lewis base can be represented by the following general formula (II) or (III):

wherein, in each of the above formulae, $M^{11}$ represents a lanthanoid element, scandium or yttrium, $X^{11}$ each independently represents a hydrogen atom, a halogen atom, an alkoxide group, a thiolate group, an amide group, a silyl group, an aldehyde residue, a ketone residue, a carboxylic acid residue, a thiocarboxylic acid residue, or a phosphorous compound residue, $L^{11}$ represents a Lewis base, and w represents 0 to 3.

Specific examples of a group (ligand) binding to the rare-earth element of the above described rare-earth element compound include: a hydrogen atom; aliphatic alkoxy groups such as a methoxy group, an ethoxy group, a propoxy group, an n-butoxy group, an isobutoxy group, a sec-butoxy group, or a tert-butoxy group; a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy groups; aliphatic thiolate groups such as a thiomethoxy group, a thioethoxy group, a thiopropoxy group, a thio-n-butoxy group, a thio-isobutoxy group, a thio-sec-butoxy group, or a thiotert-butoxy group; arylthiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, or a 2,4,6-triisopropylthiophenoxy group; aliphatic amide groups such as a dimethylamide group, a diethylamide group, or a diisopropylamide group; arylamide groups such as a phenylamide group, a 2,6-di-test-butylphenylamide group, a 2,6-diisopropylphenylamide group, a 2,6-dineopentylphenylamide group, a 2-tert-butyl-6-isopropylphenylamide group, 2-tert-butyl-6-neopentylphenylamide group, a 2-isopropyl-6-neopentylphenylamide group, or a 2,4,6-tert-butylphenylamide group; bistrialkylsilylamide groups such as a bistrimethylsilylamide group; silyl groups such as a trimethylsilyl group, a tris(trimethylsilyl)silyl group, a bis(trimethylsilyl)methylsilyl group, a trimethylsilyl(dimethyl)silyl group, or a triisopropylsilyl(bistrimethylsilyl)silyl group; and halogen atoms such as a fluorine atom, a chlorine atom, a bromine atom, or an iodine atom. Furthermore, specific examples also include: aldehyde residues such as salicylaldehyde, 2-hydroxy-1-naphthaldehyde, or 2-hydroxy-3-naphthaldehyde; hydroxyphenone residues such as 2'-hydroxyacetophenone, 2'-hydroxybutyrophenone, or 2'-hydroxypropiophenone; diketone residues such as acetylacetone, benzoylacetone, propionylacetone, isobutylacetone, valerylacetone, or ethylacetylacetone; carboxylic acid residues such as isovaleric acid, capric acid, octanoic acid, lauric acid, myristic acid, palmitic acid, stearic acid, isostearic acid, oleic acid, linoleic acid, cyclopentanecarboxylic acid, naphthenic acid, ethylhexanoic acid, pivalic acid, Versatic acid [trade name, manufactured by Shell Chemicals Japan, a synthetic acid constituted with a mixture of C10 monocarboxylic acid isomers], phenylacetic acid, benzoic acid, 2-naphthoic acid, maleic acid, or succinic acid; thiocarboxylic acid residues such as hexanethioic acid, 2,2-dimethylbutanethioic acid, decanethioic acid, or thiobenzoic acid; phosphoric acid ester residues such as dibutyl phosphate, dipentyl phosphate, dihexyl phosphate, diheptyl phosphate, dioctyl phosphate, bis(2-ethylhexyl) phosphate, bis (1-methylheptyl) phosphate, dilauryl phosphate, dioleyl phosphate, diphenyl phosphate, bis(p-nonylphenyl) phosphate, bis(polyethylene glycol-p-nonylphenyl) phosphate, (butyl)(2-ethylhexyl) phosphate, (1-methylheptyl)(2-ethylhexyl) phosphate, or (2-ethylhexyl)(p-nonylphenyl) phosphate; phosphonic acid ester residues such as monobutyl 2-ethylhexylphosphonate, mono-2-ethylhexyl 2-ethylhexylphosphonate, mono-2-ethylhexyl phenylphosphonate, mono-p-nonylphenyl 2-ethylhexylphosphonate, mono-2-ethylhexyl phosphonate, mono-1-methylheptyl phosphonate, or mono-p-nonylphenyl phosphonate; and phosphinic acid residues such as dibutylphosphinic acid, bis(2-ethylhexyl)phosphinic acid, bis(1-methylheptyl)phosphinic acid, dilaurylphosphinic acid, dioleylphosphinic acid, diphenylphosphinic acid, bis(p-nonylphenyl)phosphinic acid, butyl (2-ethylhexyl)phosphinic acid, (2-ethylhexyl)(1-methylheptyl)phosphinic acid, (2-ethylhexyl)(p-nonyl phenyl)phosphinic acid, butylphosphinic acid, 2-ethylhexylphosphinic acid; 1-methylheptylphosphinic acid, oleylphosphinic acid, iaurylphosphinic acid, phenylphosphinic acid, or p-nonylphenylphosphinic acid. These ligands may be used singly or in combinations of two or more.

In the component (A) used in the above described 1st polymerization catalyst composition, examples of the Lewis base reacting with the above described rare-earth element compound include tetrahydrofuran, diethyl ether, dimethylaniline, trimethylphosphine, lithium chloride, neutral olefins, and neutral diolefins. Herein, when the above described rare-earth element compound reacts with a plurality of Lewis bases (wherein, in the formulae (II) and (III), w is 2 or 3), the Lewis bases $L^{11}$ may be the same as or different from one another.

Preferably, the rare-earth element compound contains a compound represented by the following general formula:

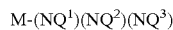

$$M-(NQ^1)(NQ^2)(NQ^3) \quad\quad (IV)$$

wherein M represents at least one selected from a lanthanoid element, scandium and yttrium, $NQ^1$, $NQ^2$ and $NQ^3$ each represent an amide group, and they may be the same as or different from one another, and each have an M-N bond.

That is to say, the compound represented by the above formula (IV) is characterized in that it has three M-N bonds. Since the compound has three M-N bonds and these bonds are chemically equivalent to one another, the compound is advantageous in that it has a stable structure and thus it is easily treated.

The amide group represented by NQ ($NQ^1$, $NQ^2$, and $NQ^3$) in the above formula (IV) may be any one of: aliphatic amide groups such as a dimethylamide group, a diethylamide group, or a diisopropylamide group; arylamide groups such as a phenylamide group, a 2,6-di-tert-butylphenylamide group, a 2,6-diisopropylphenylamide group, a 2,6-dineopentylphenylamide group, a 2-tert-butyl-6-isopropylphenylamide group, a 2-tert-butyl-6-neopentylphenylamide group, a 2-isopropyl-6-neopentylphenylamide group, or a 2,4,6-tert-butylphenylamide group; and bistrialkylsilylamide groups such as a bistrimethylsilylamide group. Among these groups, a bistrimethylsilylamide group is preferable.

The component (B) used in the above described 1st polymerization catalyst composition is at least one selected from the group consisting of an ionic compound (B-1), an aluminoxane (B-2), and a halogen compound (B-3). The total content of the component (B) in the above described 1st polymerization catalyst composition is preferably 0.1 to 50 times mol based on the component (A).

An example of the above ionic compound (B-1) is an ionic compound consisting of a non-coordinating anion and a cation, which reacts with the rare-earth element compound as component (A), or with a reaction product of the rare-earth element compound with a Lewis base, so as to generate a cationic transition metal compound. Herein, examples of the non-coordinating anion include tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis (tetrafluoromethylphenyl)borate, tetra(tolyl)borate, tetra (xylyl)borate, (triphenyl,pentafluorophenyl)borate, [tris (pentafluorophenyl),phenyl] borate, and tridecahydride-7,8-dicarbaundecaborate. On the other hand, examples of the cation include a carbonium cation, an oxonium cation, an ammonium cation, a phosphonium cation, a cycloheptatrienyl cation, and a ferrocenium cation having a transition metal. Specific examples of the carbonium cation include tri-substituted carbonium cations such as a triphenylcarbonium cation or a tri(substituted phenyl)carbonium cation. More specifically, examples of the tri(substituted phenyl) carbonyl cation include a tri(methylphenyl)carbonium cation and a tri(dimethylphenyl)carbonium cation. Specific examples of the ammonium cation include: trialkylammonium cations such as a trimethylammonium cation, a triethylammonium cation, a tripropylammonium cation, or a tributylammonium cation (e.g., a tri(n-butyl)ammonium cation); N,N-dialkylanilinium cations such as an N,N-dimethylanilinium cation, an N,N-diethylanilinium cation, or an N,N-2,4,6-pentamethylanilinium cation; and dialkylammonium cations such as a diisopropylammonium cation or a dicyclohexylammonium cation. Specific examples of the phosphonium cation include triarylphosphonium cations such as a triphenylphosphonium cation, a tri(methylphenyl) phosphonium cation, or a tri(dimethylphenyl)phosphonium cation. Accordingly, the ionic compound is preferably a compound in which a non-coordinating anion and a cation are selected from the aforementioned non-coordinating anions and cations and are combined with each other. Specifically, N,N-dimethylanilinium tetrakis(pentafluorophenyl)borate, triphenylcarbonium tetrakis(pentafluorophenyl)borate, and the like are preferable. Moreover, these ionic compounds can be used singly or in combinations of two or more. The content of the ionic compound (B-1) in the above described 1st polymerization catalyst composition is preferably 0.1 to 10 times mol, and more preferably approximately 1 time mol, based on the component (A).

The above aluminoxane (B-2) is a compound obtained by allowing an organic aluminum compound to come into contact with a condenser, and it is, for example, a linear aluminoxane or a cyclic aluminoxane having a repeating unit represented by the general formula: (—Al(R')O—) (wherein R' represents a hydrocarbon group containing 1 to 10 carbon atoms, wherein some hydrocarbon groups may be substituted with a halogen atom and/or an alkoxy group, and the polymerization degree of the repeating unit is preferably 5 or greater, and more preferably 10 or greater). Herein, specific examples of the R' include a methyl group, an ethyl group, a propyl group, and an isobutyl group, and among these, a methyl group is preferable. Moreover, examples of the organic aluminum compound used as a raw material for the aluminoxane include trialkylaluminum such as trimethylaluminum, triethylaluminum, tributylaluminum or tri-isobutylaluminum, and a mixture thereof. Among others, trimethylaluminum is particularly preferable. For example, aluminoxane, in which a mixture of trimethylaluminum and tributylaluminum is used as a raw material, can be preferably used. With regard to the content of the aluminoxane (B-2) in the above described 1st polymerization catalyst composition, the ratio of the aluminum element Al in the aluminoxane to the rare-earth element M constituting the component (A), Al/M, is preferably set at approximately 10 to 1000.

The above halogen compound (B-3) consists of at least one of Lewis acid, a complex compound of a metal halide and a Lewis base, and an organic compound comprising active halogen, and for example, it reacts with the above described rare-earth element compound as component (A), or with a reaction product of the rare-earth element compound with a Lewis base, so as to generate a cationic transition metal compound, a halogenated transition metal compound, or a compound having a transition metal center with lack of electric charge. The total content of the halogen compound (B-3) in the above described 1st polymerization catalyst composition is preferably 1 to 5 times mol based on the component (A).

As the aforementioned Lewis acid, boron-containing halogen compounds such as $B(C_6F_5)_3$, or aluminum-containing halogen compounds such as $Al(C_6F_5)_3$, can be used. In addition, halogen compounds containing an element belonging to the group 3, 4, 5, 6 or 8 of the periodic table can also be used. Preferably, an aluminum halide or an organic metal halide can be used. As the halogen element, chlorine or bromine is preferable. Specific examples of the above described Lewis acid include methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromide, ethylaluminum sesquichloride, dibutyltin dichloride, aluminum tribromide, antimony trichloride, antimony pentachloride, phosphorus trichloride, phosphorus pentachloride, tin tetrachloride, titanium tetrachloride, and tungsten hexachloride. Among these substances, diethylaluminum chloride, ethylaluminum sesquichloride, ethylaluminum dichloride, diethylaluminum bromide, ethylaluminum sesquibromide, and ethylaluminum dibromide are particularly preferable.

Examples of the metal halide constituting the above described complex compound of the metal halide and the Lewis base include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper iodide, silver chloride, silver bromide, silver iodide, gold chloride, gold iodide, and gold bromide. Among these substances, magnesium chloride, calcium chloride, barium chloride, manganese chloride, zinc chloride, and copper chloride are preferable, and magnesium chloride, manganese chloride, zinc chloride, and copper chloride are particularly preferable.

Moreover, examples of the Lewis base constituting the above described complex compound of the metal halide and the Lewis base include a phosphorus compound, a carbonyl compound, a nitrogen compound, an ether compound, and alcohol. Specific examples include tributyl phosphate, tri-2-ethylhexyl phosphate, triphenyl phosphate, tricresyl phosphate, triethylphosphine, tributyl phosphine, triphenylphosphine, diethylphosphinoethane, diphenylphosphinoethane, acetylacetone, benzoylacetone, propionitrile acetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ethylhexanoic acid, oleic acid, stearic acid, benzoic acid, naphthenic acid, versatic acid, triethylamine, N,N-dimethylacetamide, tetrahydrofuran, diphenyl ether, 2-ethylhexyl alcohol, oleyl alcohol, stearyl alcohol, phenol, benzyl alcohol, 1-decanol, and lauryl alcohol. Among these substances, tri-2-ethylhexyl phosphate, tricresyl phosphate, acetylacetone, 2-ethylhexanoic acid, versatic acid, 2-ethylhexyl alcohol, 1-decanol, and lauryl alcohol are preferable.

The above described Lewis base is allowed to react with the above described metal halide at a ratio of 0.01 to 30 mol, and preferably of 0.5 to 10 mol, based on 1 mol of the metal halide. Using a reaction product of the rare-earth element compound with this Lewis base, the amount of a metal remaining in the polymer can be reduced.

An example of the above described organic compound comprising active halogen is benzyl chloride.

The component (C) used in the above described 1st polymerization catalyst composition is an organic metal compound represented by the above general formula (I):

$$YR^1_a R^2_b R^3_c \quad (I)$$

wherein Y represents a metal selected from the groups 1, 2, 12, and 13 of the periodic table, $R^1$ and $R^2$ each represent a hydrocarbon group containing 1 to 10 carbon atoms, or a hydrogen atom, and $R^3$ represents a hydrocarbon group containing 1 to 10 carbon atoms, wherein $R^1$, $R^2$ and $R^3$ may be the same as or different from one another, and when Y is a metal selected from the group 1 of the periodic table, a is 1 and b and c are 0, when Y is a metal selected from the groups 2 and 12 of the periodic table, a and b are 1 and c is 0, and when Y is a metal selected from the group 13 of the periodic table, a, b and c are 1, and the component (C) is preferably an organic aluminum compound represented by the following general formula (V):

wherein $R^1$ and $R^2$ each represent a hydrocarbon group containing 1 to 10 carbon atoms, or a hydrogen atom, $R^3$ represents a hydrocarbon group containing 1 to 10 carbon atoms, wherein $R^1$, $R^2$ and $R^3$ may be the same as or different from one another. Examples of the organic aluminum compound represented by the general formula (V) include: trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, and trioctylaluminum; diethylaluminum hydride, di-n-propylaluminum hydride, di-n-butylaluminum hydride, diisobutylaluminum hydride, dihexylaluminum hydride, diisohexylaluminum hydride, dioctylaluminum hydride, and diisooctylaluminum hydride; and ethylaluminum dihydride, n-propylaluminum dihydride, and isobutylaluminum dihydride. Among these substances, triethylaluminum, triisobutylaluminum, diethylaluminum hydride, and diisobutylaluminum hydride are preferable. The aforementioned organic aluminum compound as component (C) can be used singly or in combinations of two or more. The content of the organic aluminum compound in the above described 1st polymerization catalyst composition is preferably 1 to 50 times mol, and more preferably approximately 10 times mol, based on the component (A).

Addition of the additive D that can be an anionic ligand is preferable because it exhibits the effect of enabling the synthesis of a copolymer with a higher content of cis-1,4 bonds at a high yield.

The additive D is not particularly limited, as long as it is exchangeable with the amide group of the component (A). The additive D preferably has any one of an OH group, an NH group, and an SH group.

Specific examples of a compound having an OH group include aliphatic alcohol and aromatic alcohol. Specific examples of such a compound include 2-ethyl-1-hexanol, dibutylhydroxytoluene, alkylated phenol, 4,4'-thiobis-(6-t-butyl-3-methyl phenol), 4,4'-butylidenebis-(6-t-butyl-3-methylphenol), 2,2'-methylenebis-(4-methyl-6-t-butylphenol), 2,2'-methylenebis-(4-ethyl-6-t-butylphenol), 2,6-di-t-4-ethylphenol, 1,1,3-tris-(2-methyl-4-hydroxy-5-t-butylphenyl)butane, n-octadecyl-3-(4-hydroxy-3,5-di-t-butylphenyl)propionate, tetrakis[methylene-3-(3,5-di-t-butyl-4-hydroxyphenyl)propionate]methane, dilaurylthiodipropionate, distearylthiodipropionate, and dimyristylylthiopropionate, but the examples are not limited thereto. For example, hindered phenol-based compounds may include triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis-(n-octylthio)-6-(4-hydroxy-3,5-di-t-butylamino)-1,3,5-triazine, pentaerythryl-tetrakis[3,5-di-t-butyl-4-hydroxyphenyl)propionate], 2,2-thio-diethylene-bis[3-(3,5-di-t-butyl-4-hydroxyphenyl)propionate], octadecyl-3-(3,5-di-t-butyl-4-hydroxyphenyl)propionate, N,N'-hexamethylene bis(3,5-di-t-butyl-4-hydroxy-hydrocinnamamide), 3,5-t-butyl-4-hydroxybenzyl phosphonate-diethyl ester, 1,3,5-trimethyl-2,4,6-tris(3,5-di-t-butyl-4-hydroxybenzyl)benzene, tris-(3,5-di-t-butyl-4-hydroxybenzyl)-isocyanurate, octylated diphenylamine, and 2,4-bis[(octylthio)methyl]-o-cresol.

Moreover, an example of a hydrazine-based compound may be N,N'-bis[3-(3,5-di-t-butyl-4-hydroxyphenyl)propionyl] hydrazine.

Examples of a compound having an NH group include primary amines and secondary amines, such as alkylamine or arylamine. Specific examples include dimethylamine, diethylamine, pyrrole, ethanolamine, diethanolamine, dicyclohexylamine, N,N'-dibenzylethylenediamine, and bis(2-diphenylphosphinophenyl)amine.

Examples of a compound having an SH group include aliphatic thiol, aromatic thiol, and compounds represented by the following general formulae (VI) and (VII):

(in the formula, $R^1$, $R^2$ and $R^3$ are each independently represented by $-O-C_jH_{2j+1}$, $-(O-C_kH_{2k}-)_a-O-C_mH_{2m+1}$, or $-C_nH_{2n+1}$, wherein at least one of $R^1$, $R^2$ and $R^3$ is $-(O-C_kH_{2k}-)_a-O-C_mH_{2m+1}$, j, m and n each independently represent 0 to 12, k and a each independently represent 1 to 12, and $R^4$ represents a linear, branched or cyclic, saturated or unsaturated alkylene group, cycloalkylene group, cycloalkylalkylene group, cycloalkenylalkylene group, alkenylene group, cycloalkenylene group, cycloalkylalkenylene group, cycloalkenylalkenylene group, arylene group or aralkylene group, containing 1 to 12 carbon atoms).

Specific examples of the compound represented by the general formula (VI) include 3-mercaptopropyltrimethoxysilane, 3-mercaptopropyltriethoxysilane, 3-mercaptopropylmethyldimethoxysilane, (mercaptomethyl)dimethylethoxysilane, and mercaptomethyltrimethoxysilane:

(in the formula, W represents $-NR^8-$, $-O-$, or $-CR^9R^{10}-$ (wherein $R^8$ and $R^9$ represent $-C_pH_{2p+1}$, $R^{10}$ represents $-C_qH_{2q+1}$, and p and q each independently represent 0 to 20), $R^5$ and $R^6$ each independently represent -M-$C_rH_{2r}-$ (wherein M represents $-O-$ or $-CH_2-$, and r represents 1 to 20), $R^7$ represents $-O-C_jH_{2j+1}$, $-(O-C_kH_{2k}-)_a-O-C_mH_{2m+1}$, or $-C_nH_{2n+1}$, j, m and n each independently represent 0 to 12, k and a each independently represent 1 to 12, and $R^4$ represents a linear, branched or cyclic, saturated or unsaturated alkylene group, cycloalkylene group, cycloalkylalkylene group, cycloalkenylalkylene group, alkenylene group, cycloalkenylene group, cycloalkylalkenylene group, cycloalkenylalkenylene group, arylene group or aralkylene group, containing 1 to 12 carbon atoms).

Specific examples of the compound represented by the general formula (VII) include 3-mercaptopropyl(ethoxy)-1,3-dioxa-6-methylaza-2-silacyclooctane, 3-mercaptopropyl(ethoxy)-1,3-dioxa-6-butylaza-2-silacyclooctane, and 3-mercaptopropyl(ethoxy)-1,3-dioxa-6-dodecylaza-2-silacyclooctane.

Moreover, as such an additive D, an anionic tridentate ligand precursor represented by the following general formula (VIII) can be preferably used:

E¹-T¹-X-T²-E²  (VIII)

wherein X represents an anionic electron-donating group containing a coordinating atom selected from the atoms of the group 15 of the periodic table, E¹ and E² each independently represent a neutral electron-donating group containing a coordinating atom selected from the atoms of the groups 15 and 16 of the periodic table, and T¹ and T² each represent a crosslinking group that crosslinks X with E¹ and E², respectively.

The additive D is preferably added in an amount of 0.01 to 10 mol, and particularly, of 0.1 to 1.2 mol, to 1 mol of the above described rare-earth element compound. When the additive amount is less than 0.1 mol, polymerization of monomers do not sufficiently progress, and thus, it becomes difficult to achieve the object of the disclosure. It is preferable to set the amount of the additive D to be equal to the amount of the rare-earth element compound (1.0 mol). Further, it may also be possible to add an excessive amount of the additive D to the rare-earth element compound. However, if the additive amount is set at larger than 1.2 mol, it causes the great loss of the reagent, and thus, it is not preferable.

In the above general formula (VIII), the neutral electron-donating groups E¹ and E² are groups containing coordinating atoms selected from the groups 15 and 16 of the periodic table. In addition, E¹ and E² may be the same groups as each other, or may also be different groups from each other. Examples of the coordinating atom include nitrogen N, phosphorus P, oxygen O, and sulfur S. Among these, P is preferable.

When the coordinating atom contained in the above E¹ and E² is P, examples of the neutral electron-donating group E¹ or E² include: diarylphosphino groups such as a diphenylphosphino group or a ditolylphosphino group; dialkylphosphino groups such as a dimethylphosphino group or a diethylphosphino group; and alkylarylphosphino groups such as a methylphenylphosphino group. Among these groups, a diarylphosphino group is preferable.

When the coordinating atom contained in the above E¹ and E² is N, examples of the neutral electron-donating group E¹ or E² include: dialkylamino groups such as a dimethylamino group, a diethylamino group, or a bis(trimethylsilyl)amino group; diarylamino groups such as a diphenylamino group; and alkylarylamino groups such as a methylphenyl group.

When the coordinating atom contained in the above E¹ and E² is O, examples of the neutral electron-donating group E¹ or E² include: alkoxy groups such as a methoxy group, an ethoxy group, a propoxy group, or a butoxy group; and aryloxy groups such as a phenoxy group or a 2,6-dimethylphenoxy group.

When the coordinating atom contained in the above E¹ and E² is S, examples of the neutral electron-donating group E¹ or E² include: alkylthio groups such as a methylthio group, an ethylthio group, a propylthio group, or a butylthio group; and arylthio groups such as a phenylthio group or a tolylthio group.

The anionic electron-donating group X is a group containing a coordinating atom selected from the group 15 of the periodic table. Preferred examples of the coordinating atom include phosphorus P and nitrogen N, and the coordinating atom is more preferably N.

The crosslinking groups T¹ and T² are not particularly limited, as long as they are groups capable of crosslinking X with E¹ and E². An example of such a crosslinking group is an arylene group optionally having a substituent on an aryl ring. Moreover, T¹ and T² may be groups that are identical to or different from each other.

The above described arylene group may be a phenylene group, a naphthylene group, a pyridylene group, a thienylene group (preferably, a phenylene group or a naphthylene group) or the like. In addition, any given group may be substituted on the aryl ring of the arylene group. Examples of the substituent include: alkyl groups such as a methyl group or an ethyl group; aryl groups such as a phenyl group or a tolyl group; halogen groups such as a fluoro, chloro, or bromo group; and silyl groups such as a trimethylsilyl group.

A more preferred example of the arylene group is a 1,2-phenylene group.

—Second Polymerization Catalyst Composition—

Next, a second polymerization catalyst composition (hereinafter also referred to as a "2nd polymerization catalyst composition") will be described. An example of the 2nd polymerization catalyst composition is a polymerization catalyst composition comprising at least one complex selected from the group consisting of: a metallocene complex represented by the following general formula (IX); a metallocene complex represented by the following general formula (X); and a half-metallocene cation complex represented by the following general formula (XI):

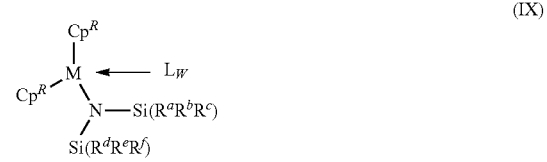

(in the formula (IX), M represents a lanthanoid element, scandium, or yttrium; $Cp^R$ each independently represents an unsubstituted or substituted indenyl; $R^a$ to $R^f$ each independently represent a hydrogen atom or an alkyl group having 1 to 3 carbon atoms; L represents a neutral Lewis base; and w represents an integer of 0 to 3);

(in the formula (X), M represents a lanthanoid element, scandium, or yttrium; $Cp^R$ each independently represents an unsubstituted or substituted indenyl; X' represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3); and

(in the formula (XI), M represents a lanthanoid element, scandium, or yttrium; $Cp^{R'}$ each independently represents an unsubstituted or substituted cyclopentadienyl, indenyl, or fluorenyl; X represents a hydrogen atom, a halogen atom, an alkoxide group, a thiolate group, an amide group, a silyl group, or a hydrocarbon group having 1 to 20 carbon atoms; L represents a neutral Lewis base; w represents an integer of 0 to 3; and [B]⁻ represents a non-coordinating anion).

The 2nd polymerization catalyst composition may further include another component such as a co-catalyst, which is contained in a general polymerization catalyst composition containing a metallocene complex. Here, the metallocene complex is a complex compound having one or more cyclopentadienyl groups or derivative cyclopentadienyl groups bonded to the central metal. In particular, a metallocene complex may be also referred to as half metallocene complex when the central metal has one cyclopentadienyl group or one derivative thereof bonded thereto.

In the polymerization system, the concentration of the complex contained in the 2nd polymerization catalyst composition is preferably defined to fall within a range of 0.1 mol/L to 0.0001 mol/L.

In the metallocene complex represented by the general formulae (IX) and (X) above, $Cp^R$ in the formulae represents an unsubstituted indenyl or substituted indenyl group. $Cp^R$ having an indenyl ring as a basic skeleton may be represented by $C_9H_{7-X}R_X$ or $C_9H_{11-X}R_X$. Here, X is an integer of 0 to 7 or 0 to 11. R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. Meanwhile, examples of metalloid in the metalloid group include germyl (Ge), stannyl (Sn), and silyl (Si). In addition, the metalloid group preferably has a hydrocarbyl group which is similar to the hydrocarbyl group described above. Specific examples of the metalloid group include a trimethylsilyl group. Specific examples of the substituted indenyl group include 2-phenyl indenyl and 2-methyl indenyl. Two $Cp^R$ in the formulae (IX) and (X) may be the same as or different from each other.

In the half metallocene cation complex represented by the general formula (XI), $Cp^{R'}$ in the formula represents an unsubstituted or substituted cyclopentadienyl, indenyl, or fluorenyl, with the unsubstituted or substituted indenyl being preferred. $Cp^{R'}$ having a cyclopentadienyl ring as a basic skeleton is represented by $C_5H_{5-X}R_X$. Here, X represents an integer of 0 to 5. Further, R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. Meanwhile, examples of metalloid in the metalloid group include germyl (Ge), stannyl (Sn), and silyl (Si). In addition, the metalloid group preferably has a hydrocarbyl group which is similar to the hydrocarbyl group described above. Specific examples of the metalloid group include a trimethylsilyl group. $Cp^{R'}$ having a cyclopentadienyl ring as a basic skeleton is exemplified by the one represented by the following formula:

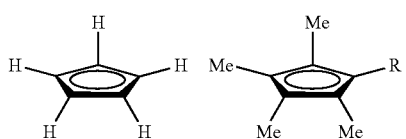

(in the formula, R represents a hydrogen atom, a methyl group, or an ethyl group).

In the general formula (XI), $Cp^{R'}$ having the indenyl ring above as a basic skeleton is similarly defined as $Cp^R$ of the general formula (IX), and preferred examples thereof are the same as those of the general formula (IX).

In the general formula (XI), $Cp^{R'}$ having the fluorenyl ring above as a basic skeleton may be represented by $C_{13}H_{9-X}R_X$ or $C_{13}H_{17-X}R_X$. Here, X represents an integer of 0 to 9 or 0 to 17. R independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group includes a trimethylsilyl group.

The central metal represented by M in the general formulae (IX), (X), and (XI) represents a lanthanoid element, scandium, or yttrium. The lanthanoid elements include 15 elements with atomic numbers 57 to 71, and may be any one of them. Preferred examples of the central metal represented by M include samarium (Sm), neodymium (Nd), praseodymium (Pr), gadolinium (Gd), cerium (Ce), holmium (Ho), scandium (Sc), and yttrium (Y).

The metallocene complex represented by the general formula (IX) includes a silyl amide ligand represented by [—N(SiR₃)₂]. Groups represented by R ($R^a$ to $R^f$ in the general formula (IX)) in the silyl amide ligand each independently represent a hydrogen atom or an alkyl group having 1 to 3 carbon atoms, and at least one of $R^a$ to $R^f$ may preferably represent a hydrogen atom. With at least one of $R^a$ to $R^f$ representing a hydrogen atom, the catalyst can be synthesized with ease, and the height around silicon can be reduced, facilitating introduction of the non-conjugated olefin or the aromatic vinyl compound. Based on the same objective, it is more preferred that at least one of $R^a$ to $R^c$ represents a hydrogen atom, and at least one of $R^d$ to $R^f$ represents a hydrogen atom. A methyl group is preferred as the alkyl group.

The metallocene complex represented by the general formula (X) includes a silyl ligand represented by [—SiX'₃]. X' in the silyl ligand represented by [—SiX'₃] is a group defined as the same as X in the general formula (XI) described below, and preferred examples thereof are also the same as those of X in the general formula (XI).

In the general formula (XI), X represents a group selected from the group consisting of a hydrogen atom, a halogen atom, an alkoxide group, a thiolate group, an amide group, a silyl group, and a hydrocarbon group having 1 to 20 carbon atoms. The alkoxide group represented by X may be any one of aliphatic alkoxy groups such as a methoxy group, an ethoxy group, a propoxy group, an n-butoxy group, an isobutoxy group, a sec-butoxy group, and a tert-butoxy group; and aryl oxide groups such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group, with the 2,6-di-tert-butylphenoxy group being preferred.

In the general formula (XI), the thiolate group represented by X may be any one of: aliphatic thiolate groups such as a thiomethoxy group, a thioethoxy group, a thiopropoxy group, a thio-n-butoxy group, a thioisobutoxy group, a thio-sec-butoxy group, and a thio-tert-butoxy group; and aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group, with the 2,4,6-triisopropylthiophenoxy group being preferred.

In the general formula (XI), the amide group represented by X may be any one of: aliphatic amide groups such as a dimethyl amide group, a diethyl amide group, and a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tri-tert-butylphenyl amide group; and bis trialkylsilyl amide groups such as a bis trimethylsilyl amide group, with the bis trimethylsilyl amide group being preferred.

In the general formula (XI), the silyl group represented by X may be any one of a trimethylsilyl group, a tris(trimethylsilyl)silyl group, a bis(trimethylsilyl)methylsilyl group, a trimethylsilyl(dimethyl)silyl group, and a triisopropylsilyl (bistrimethylsilyl)silyl group, with the tris(trimethylsilyl) silyl group being preferred.

In the general formula (XI), the halogen atom represented by X may be any one of a fluorine atom, a chlorine atom, a bromine atom, and an iodine atom, with the chlorine atom and the iodine atom being preferred. Specific examples of the hydrocarbon group having 1 to 20 carbon atoms represented by X may include: linear or branched aliphatic hydrocarbon groups such as a methyl group, an ethyl group, an n-propyl group, an isopropyl group, an n-butyl group, an isobutyl group, a sec-butyl group, a tort-butyl group, a neopentyl group, a hexyl group, and an octyl group; aromatic hydrocarbon groups such as a phenyl group, a tolyl group, and a naphthyl group; aralkyl groups such as a benzyl group; and hydrocarbon groups such as a trimethylsilylmethyl group and a bis trimethylsilylmethyl group each containing a silicon atom, with the methyl group, the ethyl group, the isobutyl group, the trimethylsilylmethyl group, and the like being preferred.

In the general formula (XI), X preferably represents the bis trimethylsilyl amide group and the hydrocarbon group having 1 to 20 carbon atoms.

In the general formula (XI), examples of the non-coordinating anion represented by [B]⁻ include tetravalent boron anions. Examples of the tetravalent boron anion include tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, (triphenyl, pentafluorophenyl)borate, [tris(pentafluorophenyl), phenyl]borate, and tridecahydride-7,8-dicarbaundecaborate, with the tetrakis (pentafluorophenyl)borate being preferred.

The metallocene complexes represented by the general formulae (IX) and (X) and the half metallocene cation complex represented by the general formula (XI) may include 0 to 3, preferably 0 or 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When the above complexes include a plurality of neutral Lewis bases L, the respective L may be the same as or different from each other.

The metallocene complexes represented by the general formulae (IX) and (X), and the half metallocene cation complex represented by the general formula (XI) may be each present as a monomer or as a dimer or a multimer having two or more monomers.

The metallocene complex represented by the general formula (IX) can be obtained by, for example, subjecting a lanthanoid trishalide, a scandium trishalide, or a yttrium trishalide to reaction in a solvent with a salt of indenyl (for example, a potassium salt or a lithium salt) and a salt of bis(trialkylsilyl)amide (for example, a potassium salt or a lithium salt). The reaction temperature may be set no higher than room temperature, and thus the complex can be produced in mild conditions. In addition, reaction time is arbitrary, and may be about several hours to several tens of hours. The reaction solvent, which is not particularly limited, may preferably the one that dissolves a raw material and a product, and may use toluene for example. In the following, a reaction example for obtaining the complex represented by the general formula (IX) is described.

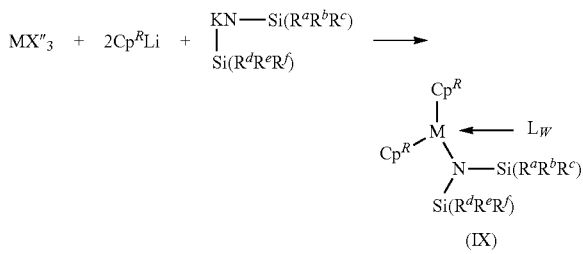

(In the formula, X" represents a halide.)

The metallocene complex represented by the general formula (X) can be obtained by, for example, subjecting a lanthanoid trishalide, a scandium trishalide, or a yttrium trishalide to reaction in a solvent with a salt of indenyl (for example, a potassium salt or a lithium salt) and a salt of silyl (for example, a potassium salt or a lithium salt). The reaction temperature may be set no higher than room temperature, and thus the complex can be produced in mild conditions. In addition, reaction time is arbitrary, and may be set to about several hours to several tens of hours. The reaction solvent, which is not particularly limited; may preferably the one that dissolves a raw material and a product, and may use toluene for example. In the following, a reaction example for obtaining the complex represented by the general formula (X) is described.

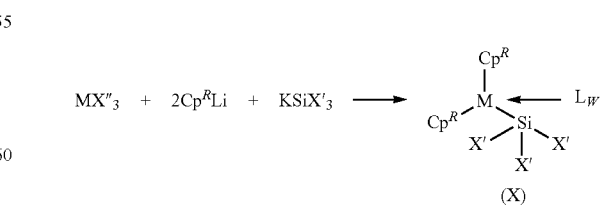

(In the formula, X" represents a halide.)

The half metallocene cation complex represented by the general formula (XI) can be obtained by, for example, the following reaction:

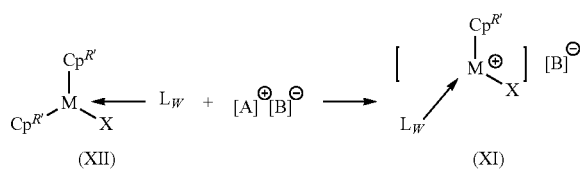

Here, in a compound represented by the general formula (XII), M represents a lanthanoid element, scandium, or yttrium; CpR' independently represents an unsubstituted or substituted cyclopentadienyl, indenyl, or fluorenyl; X represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3. Further, in the general formula [A]$^+$[B]$^-$ representing an ionic compound, [A]$^+$ represents a cation; and [B]$^-$ represents a non-coordinating anion.

Examples of the cation represented by [A]$^+$ include a carbonium cation, an oxonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation. Specific examples of the tri(substituted phenyl)carbonium cation include a tri(methylphenyl)carbonium cation. Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, a N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl)phosphonium cation, and a tri(dimethylphenyl)phosphonium cation. Of those cations, the N,N-dialkylanilinium cations or the carbonium cations are preferred, with the N,N-dialkylanilinium cations being particularly preferred.

In the general formula [A]$^+$[B]$^-$ representing the ionic compound to be used in the above reaction is a compound obtained by combining any one selected from the non-coordinating anions described above and any one selected from the cations described above, with N,N-dimethylanilinium tetrakis(pentafluorophenyl)borate and triphenylcarbonium tetrakis(pentafluorophenyl)borate being preferred. The ionic compound represented by the general formula [A]$^+$[B]$^-$ is added in an amount of preferably 0.1-fold mol to 10-fold mol and more preferably about 1-fold mol, with respect to the metallocene complex. When the half metallocene cation complex represented by the general formula (XI) is used in polymerization reaction, the half metallocene cation complex represented by the general formula (XI) may be directly supplied to the polymerization system, or alternatively, the compound represented by the general formula (XII) and the ionic compound represented by the general formula [A]$^+$[B]$^-$ may be separately supplied to the polymerization system, to thereby form the half metallocene cation complex represented by the general formula (XI) in the reaction system. In addition, the half metallocene cation complex represented by the general formula (XI) may be formed in the reaction system by using the metallocene complex represented by the general formula (IX) or (X) and the ionic compound represented by the general formula [A]$^+$[B]$^-$ in combination.

Structures of the metallocene complex represented by the general formula (IX) or (X) and of the half metallocene cation complex represented by the general formula (XI) is preferably determined by X-ray crystallography.

The co-catalyst that can be contained in the 2nd polymerization catalyst composition may be arbitrarily selected from components used as the co-catalyst for the general polymerization catalyst composition containing a metallocene complex. Preferred examples of the co-catalyst include aluminoxanes, organic aluminum compounds, and the above ionic compounds. These co-catalysts may be contained alone or in combination of two or more kinds thereof.

The aluminoxane is preferably an alkyl aluminoxane, which may be exemplified by methylaluminoxane (MAO) and modified methylaluminoxanes. In addition, preferred examples of the modified methyl aluminoxane include MMAO-3A (manufactured by Tosoh Finechem Corporation). The aluminoxane may be contained in the polymerization catalyst composition in an amount of preferably about 10 to 1,000, more preferably about 100, at an element ratio (Al/M) of the aluminum element Al of the aluminoxane to the central metal element M in the metallocene complex.

On the other hand, a preferred example of the organic aluminum compounds may include an organic aluminum compound represented by a general formula. AlRR'R" (where R and R' each independently represent a hydrocarbon group having 1 to 10 carbon atoms or a hydrogen atom, and R" is a hydrocarbon group having 1 to 10 carbon atoms). Examples of the organic aluminum compound include: trialkyl aluminum; a dialkyl aluminum chloride; an alkyl aluminum dichloride; and a dialkyl aluminum hydride; with the trialkyl aluminum being preferred. Further, examples of the trialkyl aluminum include triethyl aluminum and triisobutyl aluminum. The organic aluminum compound may be contained in the polymerization catalyst composition in an amount of preferably 1-fold mol to 50-fold mol and more preferably about 10-fold mol, with respect to the metallocene complex.

Further, in the above polymerization catalyst composition, the metallocene complex represented by the general formulae (IX) and (X) and the half metallocene complex represented by the general formula (XI) may be combined with an appropriate co-catalyst, to thereby increase the cis-1,4 bond content and the molecular weight of a polymer to be obtained.

—Third Polymerization Catalyst Composition—

Next, a third polymerization catalyst composition (hereinafter also referred to as a "3rd polymerization catalyst composition") will be described.

An example of the third polymerization catalyst composition is a polymerization catalyst composition comprising, as a rare-earth element-containing compound, a metallocene-based composite catalyst represented by the following general formula (XIII):

$$R_aMX_bQY_b \quad \text{(XIII)}$$

(In the formula, R each independently represents unsubstituted or substituted indenyl, wherein the R is coordinated to M; M represents a lanthanoid element, scandium or yttrium; X each independently represents a hydrocarbon group containing 1 to 20 carbon atoms, wherein the X is μ-coordinated to M and Q; Q represents an element of the group 13 of the periodic table; Y each independently represents a hydrocarbon group containing 1 to 20 carbon atoms, or a hydrogen atom, wherein the Y is coordinated to Q; and a and b represent 2).

A preferred example of the above described metallocene-based composite catalyst is a metallocene-based composite catalyst represented by the following general formula (XIV):

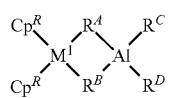

(XIV)

(In the formula, $M^1$ represents a lanthanoid element, scandium or yttrium, $Cp^R$ each independently represents unsubstituted or substituted indenyl; $R^A$ and $R^B$ each independently represent a hydrocarbon group containing 1 to 20 carbon atoms, wherein the $R^A$ and $R^B$ are μ-coordinated to $M^1$ and Al; and $R^C$ and $R^D$ each independently represent a hydrocarbon group containing 1 to 20 carbon atoms, or a hydrogen atom).

By using the above described metallocene-based polymerization catalyst, a polymer can be produced. In addition, with regard to the above described metallocene-based composite catalyst, for example by using a catalyst prepared by previously combining with an aluminum catalyst, the amount of alkylaluminum used upon the synthesis of a polymer can be reduced or the use of such alkylaluminum can be stopped. If the conventional catalyst system is used, a large amount of alkylaluminum needs to be used upon the synthesis of a polymer. For example, in the case of the conventional catalyst system, alkylaluminum needs to be used in an amount of 10 equivalents or more, with respect to the metal catalyst. However, in the case of the above described metallocene-based composite catalyst, an excellent catalytic action is exhibited by adding alkylaluminum in an amount of approximately 5 equivalents, with respect to the metal catalyst.

In the above described metallocene-based composite catalyst, the metal M in the above general formula (XIII) represents a lanthanoid element, scandium or yttrium. The lanthanoid element includes 15 elements with atomic numbers 57 to 71, and the metal M may be any one of these elements. Preferred examples of the metal M include samarium Sm, neodymium Nd, praseodymium Pr, gadolinium Gd, cerium Ce, holmium Ho, scandium Sc, and yttrium Y.

In the above general formula (XIII), R each independently represents unsubstituted indenyl or substituted indenyl, and the R is coordinated to the above described metal M. Specific examples of the substituted indenyl include a 1,2,3-trimethylindenyl group, a heptamethylindenyl group, and a 1,2,4,5,6,7-hexamethylindenyl group.

In the above general formula (XIII), Q represents an element of the group 13 of the periodic table, and specific examples of such an element include boron, aluminum, gallium, indium, and thallium.

In the above general formula (XIII), X each independently represents a hydrocarbon group containing 1 to 20 carbon atoms, and the X is μ-coordinated to M and Q. Herein, examples of the hydrocarbon group containing 1 to 20 carbon atoms include a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group. It is to be noted that the μ-coordination means a coordination manner having a crosslinking structure.

In the above general formula (XIII), Y each independently represents a hydrocarbon group containing 1 to 20 carbon atoms, or a hydrogen atom, and the Y is coordinated to Q. Herein, examples of the hydrocarbon group containing 1 to 20 carbon atoms include a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

In the above general formula (XIV), the metal $M^1$ represents a lanthanoid element, scandium or yttrium. The lanthanoid element includes 15 elements with atomic numbers 57 to 71, and the metal $M^1$ may be any one of these elements. Preferred examples of the metal $M^1$ include samarium Sm, neodymium Nd, praseodymium Pr, gadolinium Gd, cerium Ce, holmium Ho, scandium Sc, and yttrium Y.

In the above general formula (XIV), $Cp^R$ represents unsubstituted indenyl or substituted indenyl. The $Cp^R$ comprising the indenyl ring as a basic skeleton may be represented by $C_9H_{7-X}R_X$ or $C_9H_{11-X}R_X$. Herein, X is an integer of 0 to 7, or 0 to 11. Moreover, R each independently represents, preferably, a hydrocarbyl group or a metalloid group. The number of carbon atoms contained in the hydrocarbyl group is preferably 1 to 20, more preferably 1 to 10, and further preferably 1 to 8. Specific examples of the hydrocarbyl group include a methyl group, an ethyl group, a phenyl group, and a benzyl group. On the other hand, examples of the metalloid in the metalloid group include germyl Ge, stannyl Sn, and silyl Si. Furthermore, the metalloid group preferably has a hydrocarbyl group, and the hydrocarbyl groups, which the metalloid group has, are the same as the above described hydrocarbyl groups. A specific example of the metalloid group is a trimethylsilyl group.

Specific examples of the substituted indenyl include 2-phenylindenyl and 2-methylindenyl. The two $Cp^R$ in the formula (XIV) may be identical to or different from each other.

In the above general formula (XIV), $R^A$ and $R^B$ each independently represent a hydrocarbon group containing 1 to 20 carbon atoms, and the $R^A$ and $R^B$ are μ-coordinated to $M^1$ and Al. Herein, examples of the hydrocarbon group containing 1 to 20 carbon atoms include a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group. It is to be noted that the μ-coordination means a coordination manner having a crosslinking structure.

In the above general formula (XIV), $R^C$ and $R^D$ each independently represent a hydrocarbon group containing 1 to 20 carbon atoms, or a hydrogen atom. Herein, examples of the hydrocarbon group containing 1 to 20 carbon atoms include a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

The above described metallocene-based composite catalyst can be obtained, for example, by allowing a metallocene complex represented by the following general formula (XV):

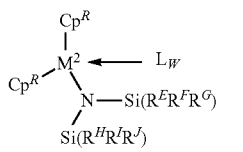

(XV)

(in the formula, $M^2$ represents a lanthanoid element, scandium or yttrium, $Cp^R$ each independently represents unsubstituted or substituted indenyl, $R^E$ to $R^J$ each independently represent an alkyl group containing 1 to 3 carbon atoms, or a hydrogen atom, L represents a neutral Lewis base, and w represents an integer of 0 to 3) to react with an organic aluminum compound represented by $AlR^K R^L R^M$ in a solvent. Since the reaction temperature may be set to be approximately a room temperature, the aforementioned metallocene-based composite catalyst can be produced under moderate conditions. Moreover, the reaction time may be arbitrarily determined, and it is approximately several hours to several tens of hours. The reaction solvent is not particularly limited. It is preferably a solvent in which raw materials and products are dissolved, and for example, toluene or hexane may be used as such a solvent. The structure of the above described metallocene-based composite catalyst is preferably determined by performing $^1$H-NMR or an X-ray structural analysis.

In the metallocene complex represented by the above general formula (XV), $Cp^R$ is unsubstituted indenyl or substituted indenyl, and it has the same definition as that of $Cp^R$ in the above general formula (XIV). In addition, in the above formula (XV), the metal $M^2$ is a lanthanoid element, scandium or yttrium, and it has the same definition as that of the metal $M^1$ in the above formula (XIV).

The metallocene complex represented by the above general formula (XV) comprises a silylamide ligand $[-N(SiR_3)_2]$. R groups ($R^E$ to $R^J$ groups) contained in the silylamide ligand each independently represent an alkyl group containing 1 to 3 carbon atoms, or a hydrogen atom. Moreover, at least one of $R^E$ to $R^J$ is preferably a hydrogen atom. By setting at least one of $R^E$ to $R^J$ to be a hydrogen atom, the synthesis of the catalyst becomes easy. Furthermore, the alkyl group is preferably a methyl group.

The metallocene complex represented by the above general formula (XV) further comprises 0 to 3, and preferably, 0 or 1 neutral Lewis base L. Herein, examples of the neutral Lewis base L include tetrahydrofuran, diethyl ether, dimethyl aniline, trimethylphosphine, lithium chloride, neutral olefins, and neutral diolefins. When the above described complex comprises a plurality of neutral Lewis bases L, the neutral Lewis bases L may be identical to or different from one another.

Further, the metallocene complex represented by the above general formula (XV) may be present in the form of monomers, and may also be present in the form of dimers or higher multimers.

On the other hand, the organic aluminum compound used in generation of the above described metallocene-based composite catalyst is represented by $AlR^K R^L R^M$, and in this formula, $R^K$ and $R^L$ each independently represent a monovalent hydrocarbon group containing 1 to 20 carbon atoms, or a hydrogen atom, and $R^M$ represents a monovalent hydrocarbon group containing 1 to 20 carbon atoms, on conditions that the $R^M$ may be identical to or different from the above described $R^K$ or $R^L$. Examples of the monovalent hydrocarbon group containing 1 to 20 carbon atoms include a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

Specific examples of the above described organic aluminum compound include: trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, and tri octylaluminum; diethylaluminum hydride, di-n-propyl aluminum hydride, di-n-butylaluminum hydride, diisobutylaluminum hydride, dihexylaluminum hydride, diisohexylaluminum hydride, dioctylaluminum hydride, and diisooctylaluminum hydride; and ethylaluminum dihydride, n-propylaluminum dihydride, and isobutylaluminum dihydride. Among these, triethylaluminum, triisobutylaluminum, diethylaluminum hydride, and diisobutylaluminum hydride are preferable. In addition, these organic aluminum compounds can be used singly or in combinations of two or more. The organic aluminum compound used in generation of the above described metallocene-based composite catalyst is used in an amount of preferably 1 to 50 times mol, and more preferably approximately 10 times mol, based on the metallocene complex.

The above described 3rd polymerization catalyst composition may comprise the above described metallocene-based composite catalyst and a boron anion, and further, it preferably comprises other components that are contained in polymerization catalyst compositions comprising ordinary metallocene-based catalysts, such as a promoter. It is to be noted that the above described metallocene-based composite catalyst and boron anion are collectively referred to as a "two-component catalyst" at times. Since the above described 3rd polymerization catalyst composition further comprises a boron anion, as well as the above described metallocene-based composite catalyst, the content of each monomeric component in a polymer can be arbitrarily regulated.

A specific example of the boron anion constituting the two-component catalyst in the above described 3rd polymerization catalyst composition is a tetravalent boron anion. Examples of the tetravalent boron anion include tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, (triphenyl,pentafluorophenyl)borate, [tris(pentafluorophenyl),phenyl]borate, and tridecahydride-7,8-dicarbaundecaborate. Among these, tetrakis(pentafluorophenyl)borate is preferable.

The above described boron anion can be used in the form of an ionic compound, in which the boron anion is combined with a cation. Examples of the above described cation include a carbonium cation, an oxonium cation, an amine cation, a phosphonium cation, a cycloheptatrienyl cation, and a ferrocenium cation having a transition metal. Examples of the carbonium cation include tri-substituted carbonium cations such as a triphenylcarbonium cation or a tri(substituted phenyl)carbonium cation. A specific example of the tri(substituted phenyl)carbonyl cation is a tri(methylphenyl)carbonium cation. Examples of the amine cation include: trialkylammonium cations such as a trimethylammonium cation, a triethylammonium cation, a tripropylammonium cation, or a tributylammonium cation; N,N-dialkylanilinium cations such as an N,N-dimethylanilinium cation, an N,N-diethylanilinium cation, or an N,N-2,4,6-pentamethylanilinium cation; and dialkylammonium cations such as a diisopropylammonium cation or a dicyclohexylammonium cation. Examples of the phosphonium cation include triarylphosphonium cations such as a triphenylphosphonium cation, a tri(methylphenyl)phosphonium cation, or a tri(dimethylphenyl)phosphonium cation. Among these cations, an N,N-dialkylanilinium cation and a carbonium cation are preferable, and an N,N-dialkylanilinium cation is particularly preferable. Accordingly, the above described ionic compound is preferably N,N-dimethylanilinium tetrakis(pentafluorophenyl)borate, triphenylcarbonium tetrakis(pentafluorophenyl)borate, or the like. The ionic compound consisting of a boron anion and a cation is added in an amount of preferably 0.1 to 10 times mol, and more preferably approximately 1 time mol, to the above described metallocene-based composite catalyst.

If a boron anion is present in a reaction system for reacting the metallocene complex represented by the above general formula (XV) with the organic aluminum compound, the metallocene-based composite catalyst represented by the above general formula (XIV) cannot be synthesized. Therefore, in order to prepare the above described 3rd polymerization catalyst composition, it is necessary to previously synthesize the metallocene-based composite catalyst, then to isolate and purity the metallocene-based composite catalyst, and then to combine the metallocene-based composite catalyst with a boron anion.

Preferred examples of the promoter that can be used in the above described 3rd polymerization catalyst composition include aluminoxane, as well as the aforementioned organic aluminum compound represented by $AlR^K R^L R^M$. The above described aluminoxane is preferably alkylaminoxane, and examples of the alkylaminoxane include methylaluminoxane (MAO) and modified methylaluminoxane. In addition, the modified methylaluminoxane is preferably MMAO-3A (manufactured by Tosoh Finechem Corporation), etc. These aluminoxanes may be used singly or in combinations of two or more.

<Coupling Step>

The coupling step is for performing reaction (coupling reaction) to modify at least part (for example, a terminal end) of a polymer chain of the multicomponent copolymer obtained in the polymerization step. In the coupling step, the coupling reaction may preferably be performed when the polymerization reaction has reached 100%.

The coupling agent used in the coupling reaction is not particularly limited and may be selected as appropriate depending on the intended use. Examples thereof may include: a tin-containing compound such as bis(maleic acid-1-octadecyl)dioctyltin (IV); an isocyanate compound such as 4,4'-diphenylmethane diisocyanate; and an alkoxysilane compound such as glycidylpropyltrimethoxysilane, which may be used alone or in combination of two or more kinds thereof, with bis(maleic acid-1-octadecyl)dioctyltin (IV) being preferred in terms of the reaction efficiency and low gel formation.

The coupling reaction thus performed may increase the number-average molecular weight (Mn).

<Cleaning Step>

The cleaning step is for cleaning the multicomponent copolymer obtained in the polymerization step. Here, the medium to be used in the cleaning is not particularly limited, and may be selected as appropriate depending on the intended use. Examples thereof may include methanol, ethanol, and isopropanol. These solvents may be added with an acid (such as hydrochloric acid, sulfuric acid, nitric acid) when using Lewis acid catalyst as the polymerization catalyst. The amount of acid to be added may preferably be 15 mol % or less to the solvent. The acid will remain in the copolymer when added in an amount exceeding 15 mol %, which may affect the reaction at kneading and vulcanization.

The cleaning step can suitably reduce catalyst residue in the copolymer.

(Rubber Composition)

The disclosed rubber composition at least includes the multicomponent copolymer according to the disclosure, and may further include, as necessary, a filler, a crosslinker and other components.

Here, other rubber components may be selected as appropriate depending on the intended use, and examples thereof may include, without being particularly limited thereto, polyisoprene, butadiene rubber (BR), acrylonitrile-butadiene rubber (NBR), chloroprene rubber, ethylene-propylene rubber (EPM), ethylene-propylene-non-conjugated diene rubber (EPDM), polysulfide rubber, silicone rubber, fluororubber, and urethane rubber, which may be used alone or in combination of two or more kinds thereof.

Further, the rubber composition may use a filler as needed for the purpose of improving reinforcement or the like. The amount of the filler to be compounded is not particularly limited, and may be selected depending on the intended use, which may be in an amount of preferably 10 to 100 parts by mass, more preferably 20 to 80 parts by mass, particularly preferably 30 to 60 parts by mass per 100 parts by mass of the rubber component. The filler compounded in an amount of 10 parts by mass or more provides an effect of improving reinforcement through the compounding of the filler, and the filler compounded in an amount of 100 parts by mass or less can maintain favorable workability while avoiding significant reduction in low loss property.

Examples of the filler may include, without being particularly limited thereto, carbon black, silica, aluminum hydroxide, clay, alumina, talc, mica, kaolin, glass balloon, glass beads, calcium carbonate, magnesium carbonate, magnesium hydroxide, magnesium oxide, titanium oxide, potassium titanate, and barium sulfate, with the use of carbon black being preferred. These may be compounded alone or in combination of two or more kinds thereof.

Examples of the carbon black may be selected as appropriate depending on the intended use without being particularly limited, and may include, for example, FEF, GPF, SRF, HAF, N339, IISAF, ISAF, SAF, which may be used alone or in combination of two or more kinds thereof.

The nitrogen absorption specific surface area ($N_2SA$, measured according to JIS K 6217-2:2001) is not particularly limited and may be selected as appropriate depending on the intended use, which may preferably be 20 to 100 $m^2/g$, and more preferably 35 to 80 $m^2/g$. The carbon black having the nitrogen absorption specific surface area ($N_2SA$) of 20 $m^2/g$ or more improves durability of the resulting rubber composition providing sufficient crack growth resistance, and the carbon black having the nitrogen absorption specific surface area ($N_2SA$) of 100 $m^2/g$ or less can maintain favorable workability while avoiding significant reduction in low loss property.

The rubber composition may use a crosslinking agent as necessary. The crosslinking agent may be selected as appropriate depending on the intended use, and the examples thereof may include, without being particularly limited, for example, a sulfur-based crosslinking agent, an organic peroxide-based crosslinking agent, an inorganic crosslinking agent, a polyamine crosslinking agent, a resin crosslinking agent, a sulfur compound-based crosslinking agent, and an oxime-nitrosamine-based crosslinking agent, with the sulfur-based crosslinking agent (vulcanizing agent) being more preferred as the rubber composition for use in tires.

The crosslinking agent above may be contained preferably in a range of 0.1 to 20 parts by mass per 100 parts by mass of the rubber component, which may be selected as appropriate depending on the intended use without being particularly limited. Crosslinking may hardly be progressed with the content of the crosslinking agent falling below 0.1 parts by mass, whereas the content exceeding 20 parts by mass tends to allow some of the crosslinking agent to inadvertently promote crosslinking during the kneading, which may also impair the physical property of the vulcanized product.

When using the vulcanizing agent, vulcanization accelerators may additionally be used in combination. Examples of the vulcanization accelerators may include a guanidine-based compound, an aldehyde-amine-based compound, an aldehyde-ammonia-based compound, a thiazole-based compound, a sulfonamide-based compound, a thiourea-based compound, a thiuram-based compound, a dithiocarbamate-based compound, and a xanthate-based compound. Further, the disclosed rubber composition may use, as necessary depending on the intended use, a softener, a vulcanization aid, a colorant, a flame retarder, a lubricant, a foaming agent, a plasticizer, a processing aid, an antioxidant, an age resistor, an antiscorching agent, an anti-ultraviolet agent, an antistatic agent, a coloration inhibitor, and other publicly-known compounding agents.

(Crosslinked Rubber Composition)

The rubber composition according to the disclosure may be crosslinked to obtain a crosslinked rubber composition. The crosslinking conditions are not particularly limited and may be selected as appropriate depending on the purpose, and the crosslinking may be performed preferably at a temperature of 120° C. to 200° C. over a warming time of 1 minute to 900 minutes. The crosslinked rubber composition thus obtained, which uses a conjugated diene compound as a monomer of the rubber component, is excellent in crosslinking property and thus has a higher mechanical property, as compared with a case of EPDM which uses a polymer having a non-conjugated diene compound as a monomer thereof.

(Tire)

Tires according to the disclosure are not particularly limited as long as they are manufactured with the disclosed rubber composition, and may be selected as appropriate depending on the intended use. The tire uses a rubber composition containing the disclosed multicomponent copolymer, and thus can be manufactured with high workability, as being high in durability and weather resistance. The disclosed rubber composition may be applied to any part of the tire with no particular limitation, which may be selected as appropriate depending on the intended use. Examples thereof may include a tread, a base tread, a sidewall, a side reinforcing rubber, and a bead filler. Of those, the disclosed rubber composition may advantageously be used for a tread in terms of durability.

The aforementioned tire may be manufactured by a conventional method. The method may include, for example, sequentially applying and stacking, onto a tire molding drum, members generally used in manufacturing tires, such as a carcass layer, a belt layer, and a tread layer formed of an unvulcanized rubber composition and/or cords, removing the drum therefrom to provide a green tire, and then vulcanizing the green tire by heating using an ordinary method, to thereby manufacture a desired tire (for example, a pneumatic tire).

(Other Applications than in Tires)

The rubber composition according to the disclosure is applicable to vibration-insulating rubbers, seismic isolation rubbers, belts for conveyor belts, rubber crawlers, and various hoses, other than to tires.

Examples

In the following, the present disclosure is described in detail with reference to Examples. However, the present disclosure is no way limited to Examples in below.

(Copolymer A)

To a sufficiently dried 2-L stainless steel reaction vessel, 200 g of a toluene solution (monomer solution) comprising 50 g (0.48 mol) of styrene used as an aromatic vinyl compound was added. On the other hand, 38.5 μmol of bis(2-phenyl-3-methylindenyl)gadolinium bis(dimethylsilyl)amide [(2-Ph-3-MeC$_9$H$_5$)$_2$GdN(SiHMe$_2$)$_2$], 42.3 μmol of dimethylanilinium tetrakis(pentafluorophenyl)borate [Me$_2$NHPhB(C$_6$F$_5$)$_4$], and 2.31 mmol of diisobutylaluminum hydride were added to a glass-made vessel in a glove box under a nitrogen atmosphere, and they were then dissolved in 10 ml of toluene to prepare a catalyst solution. Thereafter, the catalyst solution was removed from the glove box, and the catalyst solution, which was in an amount of 35 μmol relative to gadolinium, was then added to the 2-L stainless steel reaction vessel comprising the monomer solution. After that, 600 g of a monomer solution comprising 150 g (2.78 mol) of 1,3-butadiene used as a conjugated diene compound was introduced into the reaction vessel. Thereafter, while ethylene used as a non-conjugated olefin compound was introduced therein under pressurized conditions (1.5 MPa), polymerization was carried out at 80° C. for 240 minutes. After completion of the polymerization, 1 ml of an isopropanol solution of 5% by mass of 2,2'-methylene-bis(4-ethyl-6-t-butylphenol) (NS-5) was added to the reaction vessel to terminate the reaction. Subsequently, a large amount of 2-propanol was further added thereto to separate a copolymer, and the copolymer was then vacuum-dried at 70° C. to obtain a multicomponent copolymer A. The yield of the obtained copolymer A was 201 g.

(Copolymer B)

A multicomponent copolymer B was obtained by the same procedures as those for producing the above described copolymer A, with the exception that the added amounts of bis(2-phenyl-3-methylindenyl)gadolinium bis(dimethylsilyl)amide [(2-Ph-3-MeC$_9$H$_5$)$_2$GdN(SiHMe$_2$)$_2$], dimethylanilinium tetrakis(pentafluorophenyl)borate [Me$_2$NHPhB(C$_6$F$_5$)$_4$], and diisobutyl aluminum hydride were changed to 115.5 μmol, 127.1 μmol, and 0.92 mmol, respectively. The yield of the obtained copolymer B was 189 g.

(Copolymer C)

A multicomponent copolymer C was obtained by the same procedures as those for producing the above described copolymer B, with the exception that the added amount of 1,3-butadiene used as a conjugated diene compound was changed to 50 g (0.93 mol) and the added amount of diisobutylaluminum hydride was changed to 3.00 mmol. The yield of the obtained copolymer C was 146 g.

(Copolymer D)

To a sufficiently dried 2-L stainless steel reaction vessel, 200 g of a toluene solution (monomer solution) comprising 100 g (0.48 mol) of styrene used as an aromatic vinyl compound and 600 g of a monomer solution comprising 150 g (2.78 mol) of 1,3-butadiene used as a conjugated diene compound were added. On the other hand, 38.5 μmol of bis(1-methyl-2-phenylindenyl)gadolinium bis(dimethylsilyll)amide [(1-Me-2-PhC$_9$H$_5$)$_2$GdN(SiHMe$_2$)$_2$], 42.3 µmol of dimethylanilinium tetrakis(pentafluorophenyl)borate [Me$_2$NHPhB(C$_6$F$_5$)$_4$], and 2.31 mmol of diisobutylaluminum hydride were added to a glass-made vessel in a glove box under a nitrogen atmosphere, and they were then dissolved in 10 ml of toluene to prepare a catalyst solution. Thereafter, the catalyst solution was removed from the glove box, and the catalyst solution, which was in an amount of 35 µmol relative to gadolinium, was then added to the monomer solution. After that, while ethylene used as a non-conjugated olefin compound was introduced therein under pressurized conditions (0.2 MPa), polymerization was carried out at 80° C. for 240 minutes. After completion of the polymerization, 1 ml of an isopropanol solution of 5% by mass of 2,2'-methylene-bis(4-ethyl-6-t-butylphenol) (NS-5) was added to the reaction vessel to terminate the reaction. Subsequently, a large amount of 2-propanol was further added thereto to separate a copolymer, and the copolymer was then vacuum-dried at 60° C. to obtain a multicomponent copolymer D. The yield of the obtained copolymer D was 158 g.

(Copolymer E)

To a sufficiently dried 2-L stainless steel reaction vessel, 200 g of a toluene solution comprising 50 g (0.48 mol) of styrene used as an aromatic vinyl compound and 600 g of a monomer solution comprising 150 g (2.78 mol) of 1,3-butadiene used as a conjugated diene compound were added. On the other hand, 38.5 µmol of bis(2-phenyl-3-methylindenyl)gadolinium bis(dimethylsilyl)amide [(2-Ph-3-MeC$_9$H$_5$)$_2$GdN(SiHMe$_2$)$_2$] and 2.31 mmol of diisobutylaluminum hydride were added to a glass-made vessel in a glove box under a nitrogen atmosphere, and they were then dissolved in 40 ml of toluene. Thereafter, 42.3 mmol of dimethylanilinium tetrakis(pentafluorophenyl)borate [Me$_2$NHPhB (C$_6$F$_5$)$_4$] was added to the reaction solution. Thereafter, the catalyst solution was removed from the glove box, and the catalyst solution, which was in an amount of 35 µmol relative to gadolinium, was then added to the stainless steel reaction vessel. While ethylene used as a non-conjugated olefin compound was introduced therein under pressurized conditions (1.5 MPa), polymerization was carried out at 80° C. for 120 minutes. After completion of the polymerization, 5 ml of an isopropanol solution of 5% by mass of 2,2'-methylene-bis(4-ethyl-6-t-butylphenol) (NS-5) was added to the reaction vessel to terminate the reaction. Subsequently, a large amount of methanol was further added thereto to separate a copolymer, and the copolymer was then vacuum-dried at 60° C. to obtain a multicomponent copolymer E. The yield of the obtained copolymer E was 176 g.

(Copolymer F)

A binary copolymer F was obtained by the same procedures as those for producing the above described copolymer A, with the exception that a toluene solution comprising styrene was not added to the 2-L stainless steel reaction vessel. The yield of the obtained copolymer F was 164 g.

(Copolymer G)

A binary copolymer G was obtained by the same method as that for polymerizing the above described copolymer B, with the exception that a toluene solution comprising styrene was not added to the 2-L stainless steel reaction vessel. The yield of the obtained copolymer G was 155 g.

(Copolymer H)

To a sufficiently dried 2-L stainless steel reaction vessel, 300 g of a cyclohexane solution (monomer solution) comprising 15 g (0.14 mol) of styrene used as an aromatic vinyl compound was added. On the other hand, 32 µmol of 1,3-bis(t-butyldimethylsilyl)indenylgadolinium bis(bis(dimethylsilyl)amide) [{(t-Bu)Me$_2$Si}$_2$C$_9$H$_5$Gd(N(SiHMe$_2$)$_2$)$_2$], 35 µmol of dimethylanilinium tetrakis(pentafluorophenyl)borate [Me$_2$NHPhB(C$_6$F$_5$)$_4$], and 3.15 mmol of diisobutylaluminum hydride were added to a glass-made vessel in a glove box under a nitrogen atmosphere, and they were then dissolved in 20 ml of cyclohexane to prepare a catalyst solution. Thereafter, the catalyst solution was removed from the glove box, and a total amount of the catalyst solution was then added to the 2-L stainless steel reaction vessel comprising the monomer solution. After that, 640 g of a monomer solution comprising 150 g (2.78 mol) of 1,3-butadiene used as a conjugated diene compound was introduced into the reaction vessel. Thereafter, while ethylene used as a non-conjugated olefin compound was introduced therein under pressurized conditions (1.5 MPa), polymerization was carried out at 80° C. for 300 minutes. After completion of the polymerization, 1 ml of an isopropanol solution of 5% by mass of 2,2'-methylene-bis(4-ethyl-6-t-butylphenol) (NS-5) was added to the reaction vessel to terminate the reaction. Subsequently, a large amount of 2-propanol was further added thereto to separate a copolymer, and the copolymer was then vacuum-dried at 60° C. to obtain a multicomponent copolymer H. The yield of the obtained copolymer H was 167 g.

(Copolymer I)

To a sufficiently dried 2-L stainless steel reaction vessel, 280 g of a cyclohexane solution (monomer solution) comprising 80 g (0.76 mol) of styrene used as an aromatic vinyl compound was added. On the other hand, 190 µmol of 1,3-bis(t-butyldimethylsilyl)indenylgadolinium bis(bis(dimethylsilyl)amide) [{(t-Bu)Me$_2$Si}$_2$C$_9$H$_5$Gd(N(SiHMe$_2$)$_2$)$_2$], 209 µmol of dimethylanilinium tetrakis(pentafluorophenyl)borate [Me$_2$NHPhB(C$_6$F$_5$)$_4$], and 3.24 mmol of diisobutylaluminum hydride were added to a glass-made vessel in a glove box under a nitrogen atmosphere, and they were then dissolved in 70 ml of cyclohexane to prepare a catalyst solution. Thereafter, the catalyst solution was removed from the glove box, and a total amount of the catalyst solution was then added to the 2-L stainless steel reaction vessel comprising the monomer solution. After that, 640 g of a monomer solution comprising 150 g (2.78 mol) of 1,3-butadiene used as a conjugated diene compound was introduced into the reaction vessel. Thereafter, while ethylene used as a non-conjugated olefin compound was introduced therein under pressurized conditions (1.5 MPa), polymerization was carried out at 80° C. for 300 minutes. After completion of the polymerization, 1 ml of an isopropanol solution of 5% by mass of 2,2'-methylene-bis(4-ethyl-6-t-butylphenol) (NS-5) was added to the reaction vessel to terminate the reaction. Subsequently, a large amount of 2-propanol was further added thereto to separate a copolymer, and the copolymer was then vacuum-dried at 60° C. to obtain a multicomponent copolymer I. The yield of the obtained copolymer I was 240 g.

(Copolymer J)

To a sufficiently dried 2-L stainless steel reaction vessel, 200 g of a cyclohexane solution (monomer solution) comprising 5 g (0.05 mol) of styrene used as an aromatic vinyl compound was added. On the other hand, 64 µmol of 1,3-bis(t-butyldimethylsilyl)indenylgadolinium bis(bis(dimethylsilyl)amide) [{(t-Bu)Me$_2$Si}$_2$C$_9$H$_5$Gd(N(SiHMe$_2$)$_2$)$_2$], 70 µmol of dimethylanilinium tetrakis(pentafluorophenyl)borate [Me$_2$NHPhB(C$_6$F$_5$)$_4$], 2.45 mmol of diisobutylaluminum hydride, and 64 µmol of diisobutylaluminum chloride were added to a glass-made vessel in a glove box under a nitrogen atmosphere, and they were then dissolved in 20 ml of cyclohexane to prepare a catalyst solution. Thereafter, the catalyst solution was removed from the glove box, and a total amount of the catalyst solution was then added to the 2-L stainless steel reaction vessel comprising the monomer solution. After that, 400 g of a monomer solution comprising 100 g (1.85 mol) of 1,3-butadiene used as a conjugated diene compound was introduced into the reaction vessel. Thereafter, while ethylene used as a non-conjugated olefin compound was introduced therein under pressurized conditions (1.5 MPa), polymerization was carried out at 80° C. for 300 minutes. After completion of the polymerization, 1 ml of an isopropanol solution of 5% by mass of 2,2'-methylene-bis (4-ethyl-6-t-butylphenol) (NS-5) was added to the reaction vessel to terminate the reaction. Subsequently, a large amount of 2-propanol was further added thereto to separate a copolymer, and the copolymer was then vacuum-dried at 60° C. to obtain a multicomponent copolymer J. The yield of the obtained copolymer J was 89 g.

(Copolymer K)

To a sufficiently dried 2-L stainless steel reaction vessel, 200 g of a cyclohexane solution (monomer solution) comprising 5 g (0.05 mol) of styrene used as an aromatic vinyl compound was added. On the other hand, 260 µmol of bis(pentamethylcyclopentadienyl)scandium bis(dimethylsilyl)amide [(Me$_5$C$_5$)$_2$ScN(SiHMe$_2$)$_2$], 270 µmol of dimethylanilinium tetrakis(pentafluorophenyl)borate [Me$_2$NHPhB (C$_6$F$_5$)$_4$], and 2.45 mmol of diisobutylaluminum hydride were added to a glass-made vessel in a glove box under a nitrogen atmosphere, and they were then dissolved in 20 ml of cyclohexane to prepare a catalyst solution. Thereafter, the catalyst solution was removed from the glove box, and a total amount of the catalyst solution was then added to the 2-L stainless steel reaction vessel comprising the monomer solution. After that, 300 g of a monomer solution comprising 100 g (1.85 mol) of 1,3-butadiene used as a conjugated diene compound was introduced into the reaction vessel. Thereafter, while ethylene used as a non-conjugated olefin compound was introduced therein under pressurized conditions (1.5 MPa), polymerization was carried out at 80° C. for 300 minutes. After completion of the polymerization, 1 ml of an isopropanol solution of 5% by mass of 2,2'-methylene-bis (4-ethyl-6-t-butylphenol) (NS-5) was added to the reaction vessel to terminate the reaction. Subsequently, a large amount of 2-propanol was further added thereto to separate a copolymer, and the copolymer was then vacuum-dried at 60° C. to obtain a multicomponent copolymer K. The yield of the obtained copolymer K was 39 g.

(Copolymer L)

To a sufficiently dried 2-L stainless steel reaction vessel, 300 g of a cyclohexane solution (monomer solution) comprising 2 g (0.02 mol) of styrene used as an aromatic vinyl compound was added. On the other hand, 32 µmol of 1,3-bis(t-butyldimethylsilyl)indenylgadolinium bis(bis(dimethylsilyl)amide) [{(t-Bu)Me$_2$Si}$_2$C$_9$H$_5$Gd(N(SiHMe$_2$)$_2$)$_2$], 35 µmol of dimethylanilinium tetrakis(pentafluorophenyl) borate [Me$_2$NHPhB(C$_6$F$_5$)$_4$], and 3.15 mmol of diisobutylaluminum hydride were added to a glass-made vessel in a glove box under a nitrogen atmosphere, and they were then dissolved in 20 ml of cyclohexane to prepare a catalyst solution. Thereafter, the catalyst solution was removed from the glove box, and a total amount of the catalyst solution was then added to the 2-L stainless steel reaction vessel comprising the monomer solution. After that, 640 g of a monomer solution comprising 150 g (2.78 mot) of 1,3-butadiene used as a conjugated diene compound was introduced into the reaction vessel. Thereafter, while ethylene used as a non-conjugated olefin compound was introduced therein under pressurized conditions (0.5 MPa), polymerization was carried out at 80° C. for 300 minutes. After completion of the polymerization, 1 ml of an isopropanol solution of 5% by mass of 2,2'-methylene-bis(4-ethyl-6-t-butylphenol) (NS-5) was added to the reaction vessel to terminate the reaction. Subsequently, a large amount of 2-propanol was further added thereto to separate a copolymer, and the copolymer was then vacuum-dried at 60° C. to obtain a multicomponent copolymer L. The yield of the obtained copolymer L was 146 g.

(Copolymer M)

To a sufficiently dried 2-L stainless steel reaction vessel, 400 g of a cyclohexane solution (monomer solution) comprising 80 g (0.77 mol) of styrene used as an aromatic vinyl compound was added. On the other hand, 105 µmol of 1,3-bis(t-butyldimethylsilyl)indenylgadolinium bis(bis(dimethylsilyl)amide) [{(t-Bu)Me$_2$Si}$_2$C$_9$H$_5$Gd(N(SiHMe$_2$)$_2$)$_2$], 116 µmol of trityl tetrakis(pentafluorophenyl)borate [Ph$_3$CB (C$_6$F$_5$)$_4$], and 5.16 mmol of diisobutylaluminum hydride were added to a glass-made vessel in a glove box under a nitrogen atmosphere, and they were then dissolved in 50 ml of cyclohexane to prepare a catalyst solution. Thereafter, the catalyst solution was removed from the glove box, and a total amount of the catalyst solution was then added to the 2-L stainless steel reaction vessel comprising the monomer solution. After that, 50 g of a monomer solution comprising 10 g (0.19 mol) of 1,3-butadiene used as a conjugated diene compound was introduced into the reaction vessel. Thereafter, while ethylene used as a non-conjugated olefin compound was introduced therein under pressurized conditions (1.5 MPa), polymerization was carried out at 70° C. for 300 minutes. After completion of the polymerization, 1 ml of an isopropanol solution of 5% by mass of 2,2'-methylene-bis (4-ethyl-6-t-butylphenol) (NS-5) was added to the reaction vessel to terminate the reaction. Subsequently, a large amount of 2-propanol was further added thereto to separate a copolymer, and the copolymer was then vacuum-dried at 60° C. to obtain a multicomponent copolymer M. The yield of the obtained copolymer M was 130 g.

(Copolymer N)

104 g (1 mol) of styrene used as an aromatic vinyl compound and 50 g of toluene were added to a sufficiently dried 1-L pressure-resistant glass-made vessel in a glove box under a nitrogen atmosphere, and the vessel was then closed with a cap. Thereafter, the vessel was removed from the glove box, and 54 g (1 mol) of 1,3-butadiene used as a conjugated diene compound was added to the vessel to prepare a monomer solution. On the other hand, 60 µmol of bis(2-phenyl-3-methylindenyl)gadolinium bis(dimethylsilyl)amide [(2-Ph-3-MeC$_9$H$_5$)$_2$GdN(SiHMe$_2$)$_2$], 60 µmol of trityl tetrakis(pentafluorophenyl)borate [Ph$_3$CB(C$_6$F$_5$)$_4$], and 700 µmol of diisobutylaluminum hydride were added to a glass-made vessel in a glove box under a nitrogen atmosphere, and they were then dissolved in 10 ml of toluene to prepare a catalyst solution. Thereafter, the catalyst solution was removed from the glove box, and the monomer solution was then added thereto, followed by performing polymerization at 70° C. for 30 minutes. After completion of the polymerization, 5 ml of an isopropanol solution of 5% by mass of 2,2'-methylene-bis(4-ethyl-6-t-butylphenol) (NS-5) was added to the reaction vessel to terminate the reaction. Subsequently, a large amount of methanol/hydrochloric acid mixed solvent was further added thereto to separate a copolymer, and the copolymer was then vacuum-dried at 60° C. to obtain a styrene-butadiene copolymer having a high cis content. The yield of the obtained copolymer was 29.6 g.

Subsequently, a catalyst solution of nickel naphthenate: triethylaluminum:butadiene=1:3:3 (molar ratio) that had previously been prepared in another vessel was added to the obtained copolymer, such that 1 mol of nickel could be added to 1000 mol of the 1,3-butadiene unit in the obtained copolymer. Thereafter, hydrogen was introduced at a pressure of 30 atm into the reaction system, and the reaction was then carried out at 80° C. to obtain a copolymer N. The yield of the obtained copolymer N was 21.3 g.

The above-obtained copolymers A to N were measured and evaluated for the weight average molecular weight (Mw), the molecular weight distribution (Mw/Mn), the microstructure, and the melting point ($T_m$) by the following methods. The results are shown in Tables 1 and 2.

(1) Weight Average Molecular Weight (Mw) and Molecular Weight Distribution (Mw/Mn)

The weight average molecular weight (Mw) relative to polystyrene standards and the molecular weight distribution (Mw/Mn) of each of the copolymers A to N were determined based on monodispersed polystyrene according to gel permeation chromatography [GPC: HLC-8121GPC/HT (manufactured by Tosoh Corporation), column: two of $GMH_{HR}$-H(S)HT (manufactured by Tosoh Corporation), detector: a differential refractometer (RI)]. The measurement temperature was set at 40° C.

(2) Microstructure

Microstructure in the copolymers A to N were obtained based on, for example, an integration ratio of the $^1$H-NMR spectrum (1,2-vinyl bond content) and the $^{13}$C-NMR spectrum (the content ratio of cis-1,4 bond and trans-1,4 bond). Tables 1 and 2 show the content (%) of cis-1,4 bonds, the content (%) of trans-1,4 bonds, and the content (%) of 1,2-vinyl bonds in the entire conjugated diene unit, the content (mol %) of the conjugated diene unit, the content (mol %) of the non-conjugated olefin unit, the content (mol %) of the aromatic vinyl unit, and the ratio between the ethylene unit and the styrene unit.

(3) Melting Point ($T_m$)

The copolymers A to N were measured for melting points using differential scanning calorimeter (DSC, "DSCQ2000" manufactured by TA Instruments Japan Inc.), according to JIS K 7121-1987. The crystallinity decreases as the melting point becomes lower; when no melting point is detected, the copolymer is amorphous. Here, the "Non" in Tables 1 and 2 means that no melting point was detected. When the copolymer had a plurality of melting points, the value of the highest is shown in Table 1 as the evaluation target.

TABLE 1

|  | Example 1 Copolymer A (Multi-component) | Example 2 Copolymer B (Multi-component) | Example 3 Copolymer C (Multi-component) | Example 4 Copolymer D (Multi-component) | Example 5 Copolymer E (Multi-component) | Comparative Example 1 Copolymer F (Two component) | Comparative Example 2 Copolymer G (Two component) |
|---|---|---|---|---|---|---|---|
| Mw | 112,000 | 304,000 | 53,000 | 26,000 | 754,000 | 236,000 | 560,000 |
| Mw/Mn | 1.91 | 2.39 | 1.57 | 4.5 | 7.5 | 3.01 | 5.32 |
| Content of cis-1,4 bonds (%) | 95.0 | 94.2 | 94.6 | 92.3 | 96.4 | 95.2 | 91.3 |
| Content of trans-1,4 bonds (%) | 3.45 | 2.55 | 4.22 | 5.87 | 1.96 | 3.40 | 6.60 |
| Content of 1,2-vinyl bonds (%) | 1.55 | 3.25 | 1.18 | 1.83 | 1.64 | 1.40 | 2.10 |
| Content of conjugated diene unit (mol %) | 60.0 | 52.1 | 23.6 | 86.7 | 73.6 | 58.0 | 88.0 |
| Content of non-conjugated olefin unit (mol %) | 35.2 | 43.4 | 67.5 | 1.76 | 21.7 | 42.0 | 12.0 |
| Content of aromatic vinyl unit (mol %) | 4.8 | 4.5 | 8.9 | 11.54 | 4.7 | 0 | 0 |
| Ethylene unit:styrene unit (mol ratio) | 88.0:12.0 | 90.6:9.4 | 88.4:11.6 | 13.2:86.8 | 82.1:17.9 | 100:0 | 100:0 |
| Melting point $T_m$ | 47.9 | 46.8 | 44.9 | Non | Non | 129 | 96 |

TABLE 2

|  | Example 6 Copolymer H (Multi-component) | Example 7 Copolymer I (Multi-component) | Example 8 Copolymer J (Multi-component) | Example 9 Copolymer K (Multi-component) | Example 10 Copolymer L (Multi-component) | Example 11 Copolymer M (Multi-component) | Comparative Example 3 Copolymer N (Two component) |
|---|---|---|---|---|---|---|---|
| Mw | 425,000 | 256,000 | 163,000 | 64,000 | 362,000 | 193,000 | 184,000 |
| Mw/Mn | 4.57 | 3.36 | 4.61 | 3.84 | 2.65 | 4.83 | 4.02 |
| Content of cis-1,4 bonds (%) | 91.3 | 88.3 | 92.4 | 86.4 | 96.3 | 93.2 | 48.2 |
| Content of trans-1,4 bonds (%) | 6.5 | 8.3 | 5.8 | 8.2 | 3.4 | 8.1 | 43.6 |
| Content of 1,2-vinyl bonds (%) | 2.2 | 3.4 | 1.8 | 5.4 | 0.3 | 1.3 | 8.2 |
| Content of conjugated diene unit (mol %) | 71.2 | 53.0 | 63.7 | 85.3 | 99.2 | 0.4 | 65.0 |
| Content of non-conjugated olefin unit (mol %) | 28.3 | 11.1 | 34.2 | 13.5 | 0.5 | 95.4 | 30.4 |
| Content of aromatic vinyl unit (mol %) | 0.5 | 35.9 | 2.1 | 1.2 | 0.3 | 4.2 | 4.6 |
| Ethylene unit:styrene unit (mol ratio) | 98.3:1.7 | 23.6:76.4 | 94.2:5.8 | 91.8:8.2 | 62.5:37.5 | 95.8:4.2 | 86.9:13.1 |
| Melting point $T_m$ | 84.6 | 62.1 | 54.1 | 74.6 | Non | Non | Non |

Figure 2:
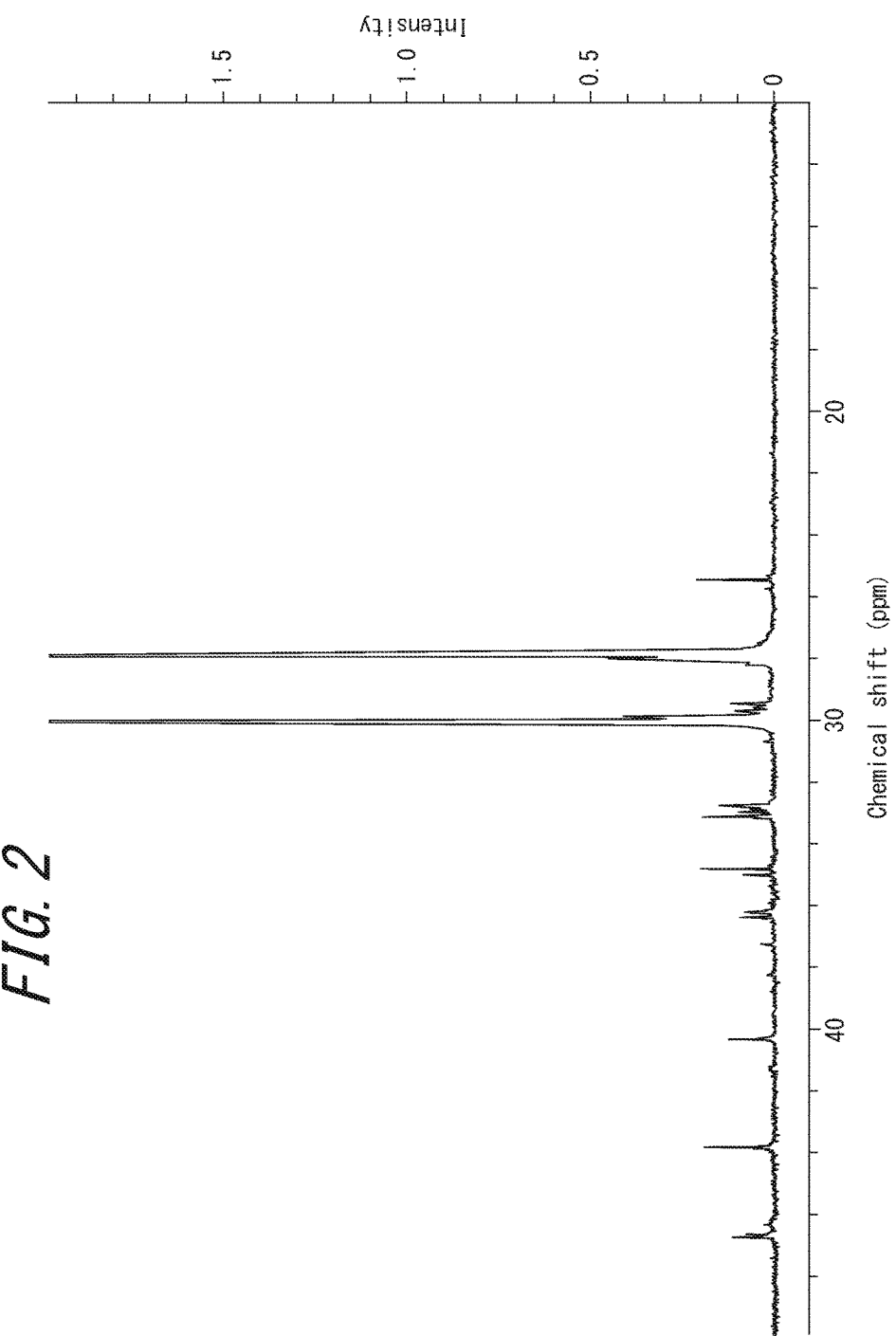
FIG. 2 is a view showing the $^{13}$C-NMR spectrum chart (in the range of 10 to 50 ppm) of copolymer A in Examples.

Moreover, FIGS. 1 and 2 show the $^{13}$C-NMR spectrum chart of the copolymer A (in the range of 0 to 150 ppm and in the range of 10 to 50 ppm). It is to be noted that in the $^{13}$C-NMR, tetrachloroethane was used as a solvent and the measurement temperature was set at 100° C. In this $^{13}$C-NMR spectrum chart, since no peaks were observed in 10 to 24 ppm, it is found that the main chain of the copolymer A consists only of an acyclic structure. Also, no peaks were observed in 10 to 24 ppm in the case of the copolymers B to N.

From Tables 1 and 2, it is found that the copolymers of Examples 1 to 11 each contain a conjugated diene unit, a non-conjugated olefin unit, and an aromatic vinyl unit, and that the content of cis-1,4 bonds in the entire conjugated diene unit is 50% or more. It can be said that both high durability and high weather resistance can be obtained because of these units.

Moreover, it is also found that the copolymers of Examples 1 to 11 each have a lower melting point than those of the binary copolymers of Comparative Examples 1 and 2, or have lost such a melting point, and thus, these copolymers have low crystallinity. Accordingly, these copolymers can enhance workability upon the production of a rubber composition, a tire and the like.

Further, it is found that the copolymer of Comparative Example 3 produced by using two types of monomers contains a conjugated diene unit, a non-conjugated olefin unit, and an aromatic vinyl unit, but that the content of cis-1,4 bonds is less than 50% in the entire conjugated diene unit. Accordingly, this copolymer cannot sufficiently improve the durability of a rubber composition, a tire or the like.

INDUSTRIAL APPLICABILITY

According to the disclosure, a polymer that contributes to the improvement of the durability and weather resistance of rubber compositions or rubber products such as a tire, and has low crystallinity, can be provided. In addition, according to the disclosure, a rubber composition and a tire, which can be produced with high workability and have high durability and weather resistance, can be provided.

The invention claimed is:

1. A multicomponent copolymer comprising a conjugated diene unit, a non-conjugated olefin unit, and an aromatic vinyl unit, wherein the multicomponent copolymer has a main chain consisting only of an acyclic structure, the content of cis-1,4 bonds in the entire conjugated diene unit is 50% or more, the content of the conjugated diene unit is 1 to 99 mol %, the total content of the non-conjugated olefin unit and the aromatic vinyl unit is 1 to 99 mol %, and a mole ratio represented by the non-conjugated olefin unit:the aromatic vinyl unit is 13.2:86.8 to 98.3:1.7.

2. The multicomponent copolymer according to claim 1, wherein the non-conjugated olefin unit is an acyclic non-conjugated olefin unit.

3. The multicomponent copolymer according to claim 2, wherein the acyclic non-conjugated olefin unit consists only of an ethylene unit.

4. The multicomponent copolymer according to claim 1, wherein the highest melting point ($T_m$) is 100° C. or lower, or the melting point ($T_m$) has disappeared.

5. The multicomponent copolymer according to claim 1, wherein the aromatic vinyl unit comprises a styrene unit.

6. The multicomponent copolymer according to claim 1, wherein the conjugated diene unit comprises a 1,3-butadiene unit and/or an isoprene unit.

7. The multicomponent copolymer according to claim 1, wherein the conjugated diene unit consists only of a 1,3-butadiene unit.

8. The multicomponent copolymer according to claim 1, which is a terpolymer consisting only of a 1,3-butadiene unit, an ethylene unit, and a styrene unit.

9. A rubber composition comprising the multicomponent copolymer according to claim 1.

10. A tire, wherein the rubber composition according to claim 9 is used.

11. A multicomponent copolymer comprising a conjugated diene unit, a non-conjugated olefin unit, and an aromatic vinyl unit, wherein the multicomponent copolymer has a main chain consisting only of an acyclic structure, the content of cis-1,4 bonds in the entire conjugated diene unit is 50% or more, the content of the conjugated diene unit is 1 to 52.1 mol % and the total content of the non-conjugated olefin unit and the aromatic vinyl unit is 47.9 to 99 mol %.

12. The multicomponent copolymer according to claim 11, wherein the non-conjugated olefin unit is an acyclic non-conjugated olefin unit.

13. The multicomponent copolymer according to claim 12, wherein the acyclic non-conjugated olefin unit consists only of an ethylene unit.

14. The multicomponent copolymer according to claim 11, wherein the highest melting point ($T_m$) is 100° C. or lower, or the melting point ($T_m$) has disappeared.

15. The multicomponent copolymer according to claim 11, wherein the aromatic vinyl unit comprises a styrene unit.

16. The multicomponent copolymer according to claim 11, wherein the conjugated diene unit comprises a 1,3-butadiene unit and/or an isoprene unit.

17. The multicomponent copolymer according to claim 11, which is a terpolymer consisting only of a 1,3-butadiene unit, an ethylene unit, and a styrene unit.

18. A rubber composition comprising the multicomponent copolymer according to claim 11.

19. A tire, wherein the rubber composition according to claim 18 is used.

* * * * *